United States Patent [19]
Woodgate et al.

[11] Patent Number: 6,014,164
[45] Date of Patent: *Jan. 11, 2000

[54] DISPLAY FOR 3D IMAGES

[75] Inventors: Graham John Woodgate; David Ezra; Basil Arthur Omar, all of Oxfordshire, United Kingdom

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,086

[22] Filed: May 23, 1997

Related U.S. Application Data

[63] Continuation of application No. 08/347,496, Nov. 30, 1994, abandoned.

[30] Foreign Application Priority Data

Dec. 1, 1993 [GB] United Kingdom ................... 9324703
Oct. 21, 1994 [GB] United Kingdom ................... 9421278

[51] Int. Cl.$^7$ .................................................. H04N 13/00
[52] U.S. Cl. ............................................... 348/51; 348/42
[58] Field of Search ......................... 348/42, 43, 46–52, 348/54–59; 349/15, 61; 359/462, 561, 619, 463, 466, 475; H04N 7/18, 13/00

[56] References Cited

U.S. PATENT DOCUMENTS

| | | |
|---|---|---|
| 4,649,425 | 3/1987 | Pund . |
| 4,829,365 | 5/1989 | Eichenlaub ............................. 348/42 |
| 4,959,641 | 9/1990 | Bass et al. ............................. 348/51 |
| 4,987,487 | 1/1991 | Ichinose et al. ....................... 348/59 |
| 5,083,199 | 1/1992 | Borner . |
| 5,132,839 | 7/1992 | Travis .................................... 359/462 |
| 5,258,833 | 11/1993 | Schenk ................................... 348/51 |
| 5,311,220 | 5/1994 | Eichenlaub .............................. 348/55 |
| 5,327,286 | 7/1994 | Sampsell et al. ..................... 359/561 |
| 5,349,379 | 9/1994 | Eichenlaub .............................. 348/54 |
| 5,392,140 | 2/1995 | Ezra et al. ............................. 359/40 |
| 5,457,574 | 10/1995 | Eichenlaub ........................... 359/462 |
| 5,465,175 | 11/1995 | Woodgate et al. .................... 359/462 |
| 5,712,732 | 1/1998 | Street . |

FOREIGN PATENT DOCUMENTS

| | | |
|---|---|---|
| 0189233 | 7/1986 | European Pat. Off. . |
| 0262955 | 4/1988 | European Pat. Off. . |
| 0354851 | 2/1990 | European Pat. Off. . |
| 0404289 | 12/1990 | European Pat. Off. . |
| 0576106 | 12/1993 | European Pat. Off. . |
| 4309667 | 9/1994 | Germany . |
| 2206763 | 1/1989 | United Kingdom . |
| 9319394 | 9/1993 | WIPO . |

OTHER PUBLICATIONS

Pastoor et al, Proceedings of the SID, vol. 30/3, 1989 "Subjective Assessments of the Resolution of Viewing Directions in a Multi–Viewpoint 3D TV System". pp. 217–223.

*Primary Examiner*—Richard Lee

[57] ABSTRACT

Left eye and right eye images of an autostereoscopic display are displayed on LCD spatial light modulators which are illuminated by movable light sources via converging lenses or mirrors. A tracking system tracks the position of an observer and a control system controls the positions of the light sources so that the images of the light sources formed by the lenses or mirrors track the observer. The observer thus sees the 3D image while having an enlarged degree of freedom of movement.

19 Claims, 25 Drawing Sheets

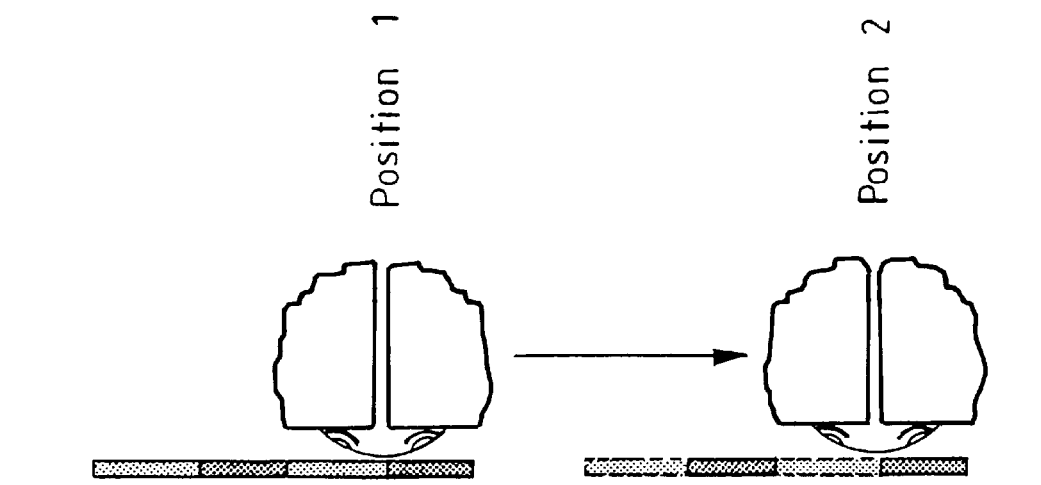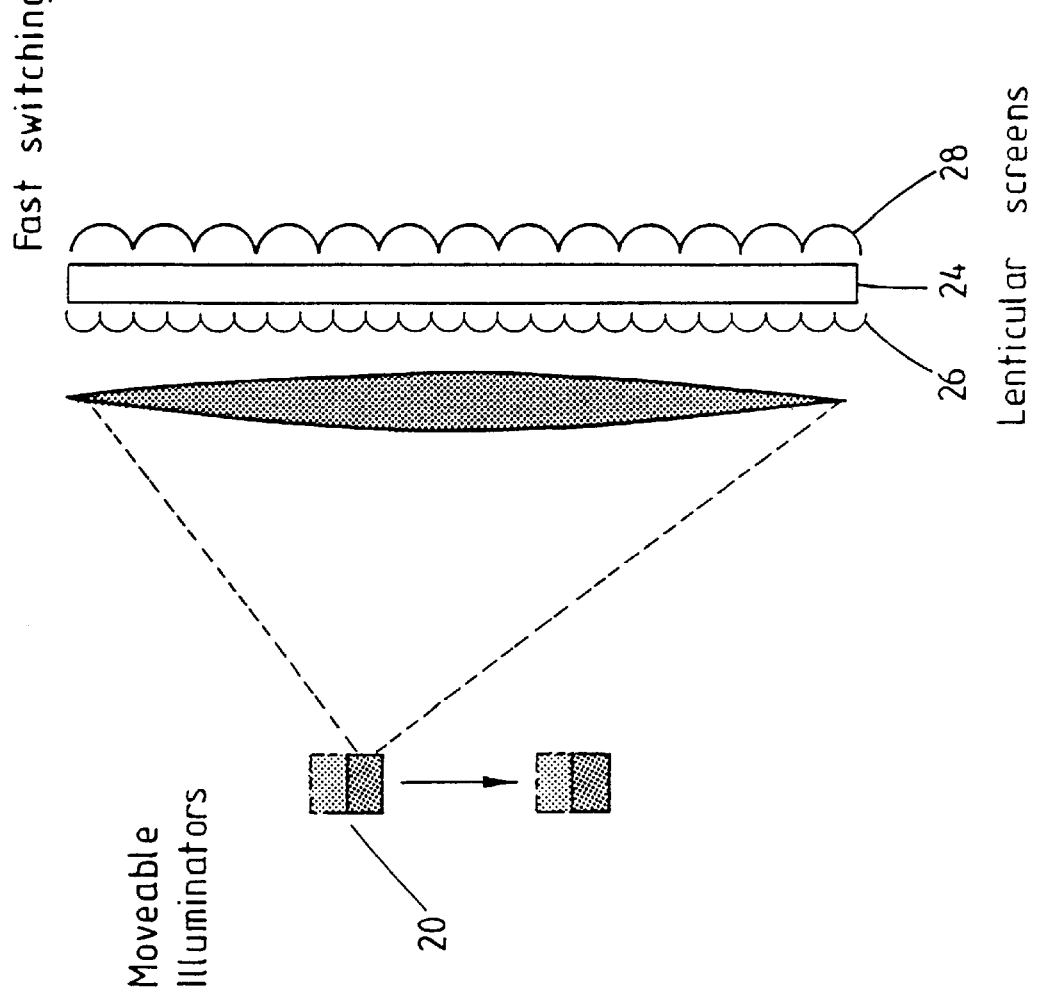
FIG 6

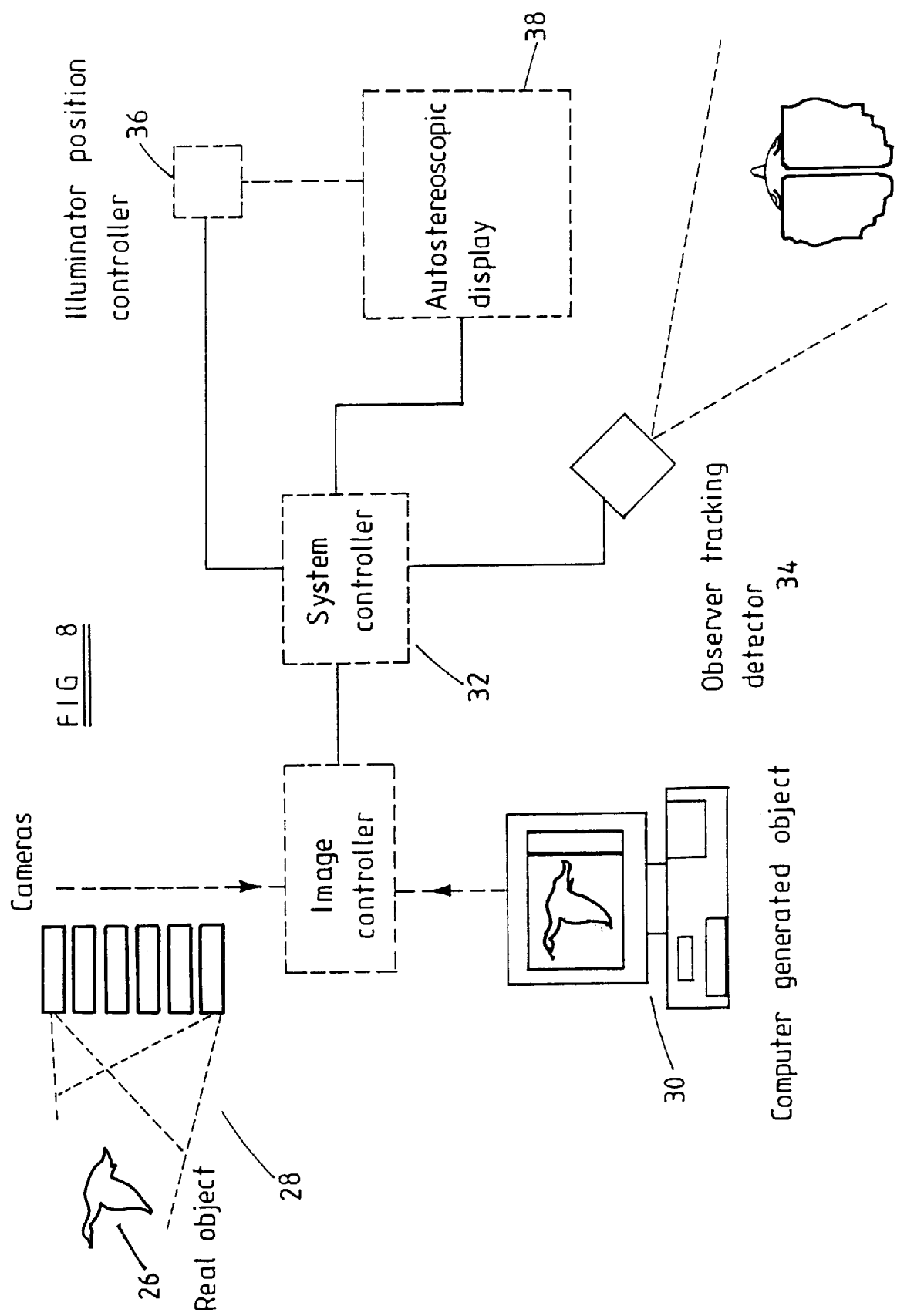

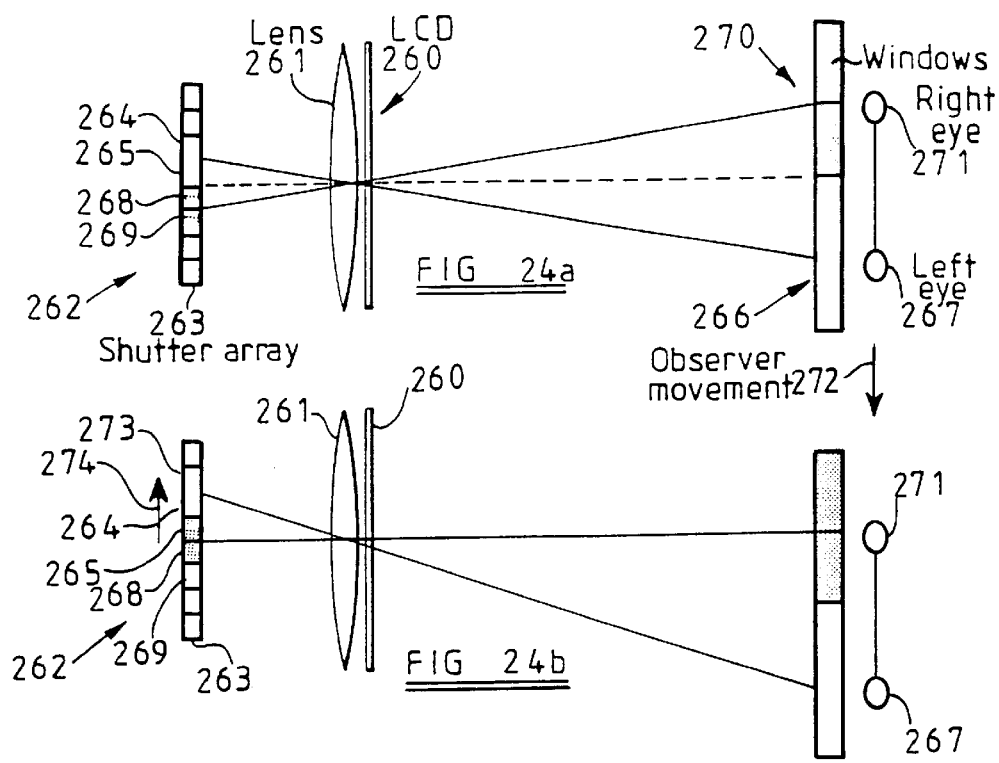
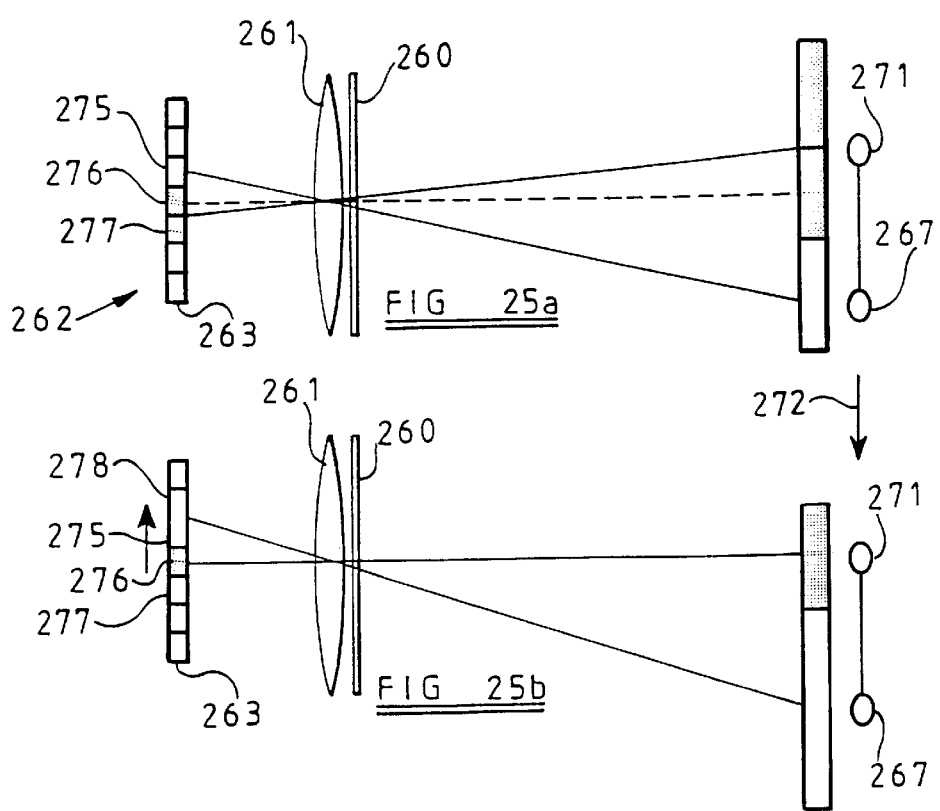

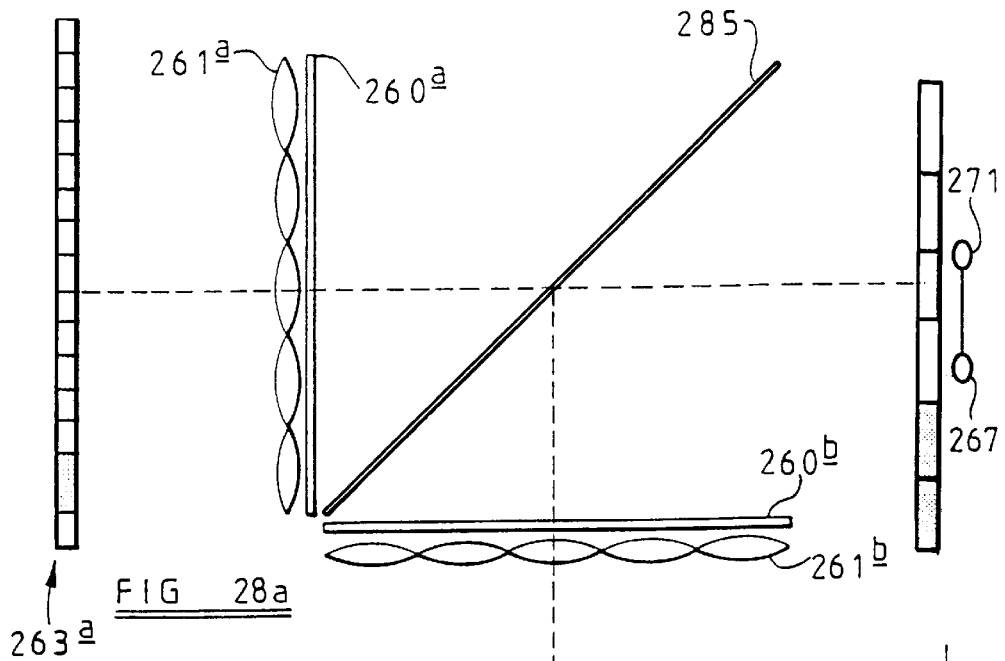
FIG 28a
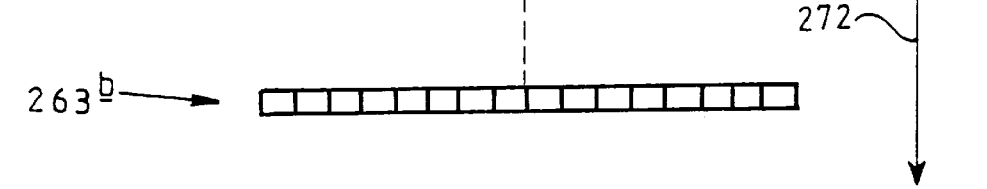
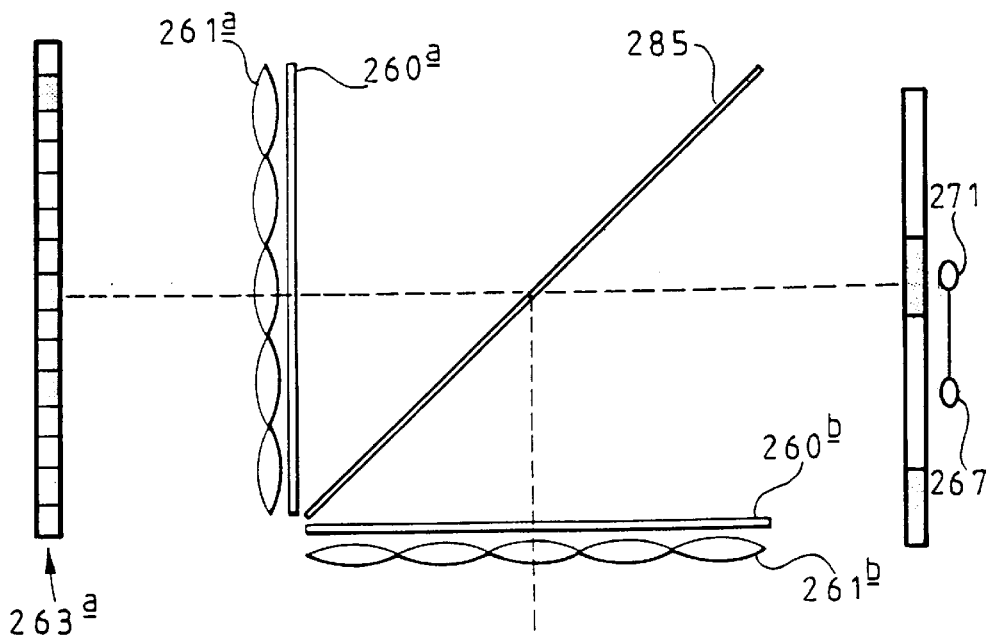
FIG 28b

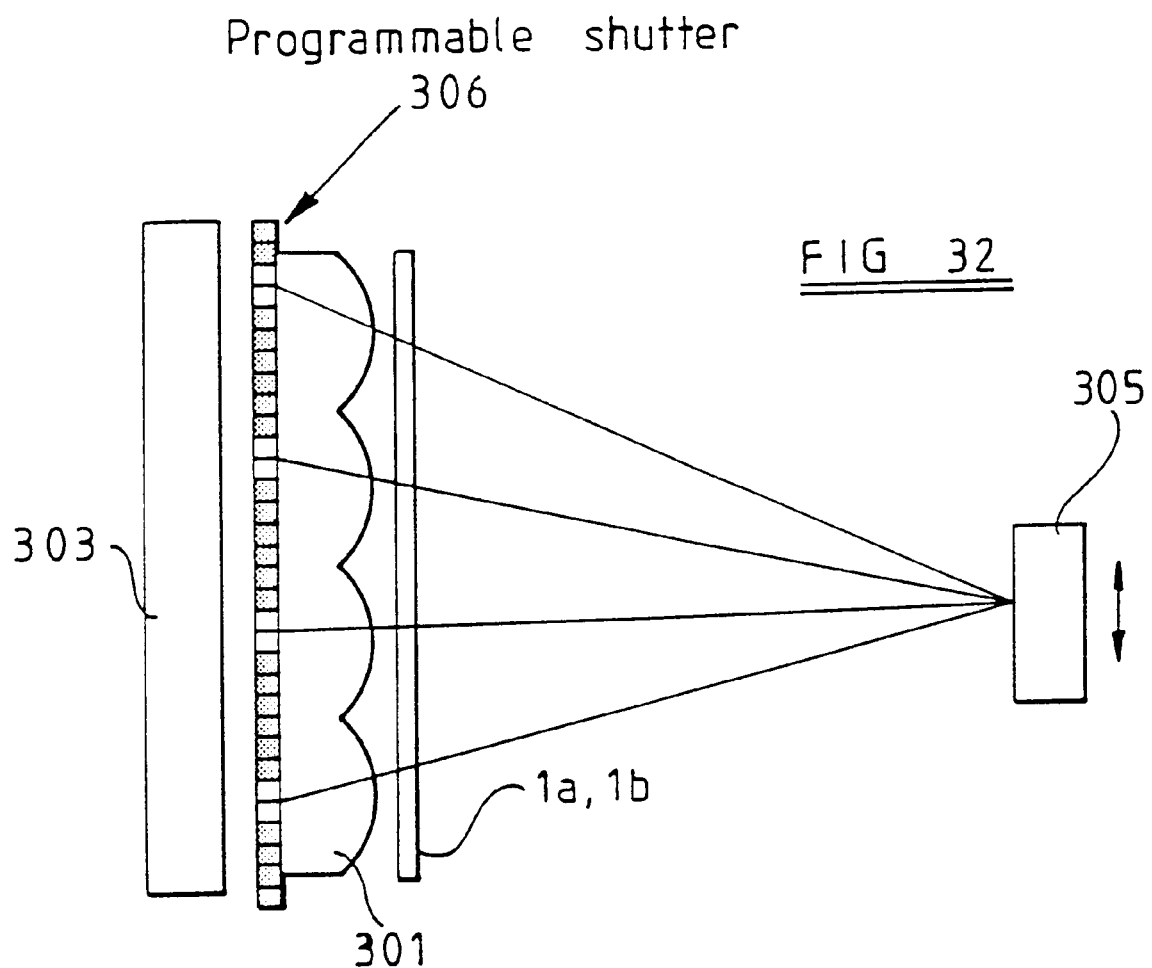

DISPLAY FOR 3D IMAGES

This is a continuation of Ser. No. 08/347,496 filed on Nov. 30, 1994 now abandoned.

BACKGROUND OF THE INVENTION

The present invention relates to a display for three dimensional images.

Known display devices for producing three dimensional (3D) images create the illusion of a 3D opaque object by displaying a number of two dimensional (2D) images to the observer. Each of the 2D images is a view of the object from a particular direction and, during reproduction of the 3D image, each component 2D image is replayed in its respective direction.

The freedom of movement of the viewer location is limited by the total angular range over which the views are imaged. Known displays capable of imaging only a low number of 2D views provide a 3D image within a highly restricted range of viewing angles. Consequently the viewer is constrained to be within a limited range of positions in order to maintain the appearance of a 3D image. Similarly, the number of observers of a 3D image may also be restricted due to the limited number of 2D views.

"Subjective Assessments of the Resolution of Viewing Directions in a Multi Viewpoint 3D TV System", S. Pastoor, K. Schenke, p 217 Proc. SID Vol. 30/3 1989 describes the requirement for the number of views in a 3D display. It is estimated that, for a typical scene, 60 or more views may be required in an interocular spacing. For a wide field of view, several hundred views will have to be displayed at some time. It is currently not possible to achieve this with a simultaneous view presentation type of display.

A display described by Akiyama.K, and Tetsutani,N in a paper titled "Three dimensional visual communication" 1991 ITE Annual convention, p607, has a two view display produced by providing an interlaced image on a liquid crystal device (LCD) behind a lenticular screen. The position of an observer is monitored and, as the observer moves from an orthoscopic viewing zone to a pseudoscopic viewing zone, the sequence in which the images are interlaced is reversed so as to maintain the appearance of an orthoscopic image to the observer. Such a system requires precise tracking of the observer's head so as to determine the time at which the image sequence should be reversed. Further, such a display is limited to use by a single observer and the black mask of the LCD is made visible by the lenticular screen.

EP-A-0 404 289 "Television set or the like for creating a three dimensional perception of images and apparatus for creation of same" describes a 3D display in which a lenticular screen is moved with respect to a high resolution display device in response to movement of an observer. Such an apparatus requires very precise control of the motion of the lenticular screen and is limited for use by a single observer.

GB 2 206 763 discloses a 3D display apparatus of the temporally multiplexed type in which 2D images representing views taken from different directions are supplied to an LCD. A spatially modulated light source such as a cathode ray tube (CRT) is disposed in the focal plane of a lens disposed adjacent the LCD. Different regions of the CRT screen are illuminated in synchronism with the different 2D images displayed by the LCD so that the views are visible in the directions from which they were taken.

SUMMARY OF THE INVENTION

According to the invention, there is provided an autostereoscopic display apparatus as defined in the appended claim 1.

Preferred embodiments of the invention are defined in the other appended claims.

It is thus possible to provide an autostereoscopic display for displaying a 3D image which can track the movement of one or more observers. The or each observer has a substantially increased degree of freedom of movement within which the 3D image is visible.

The present invention will further be described, by way of example, with reference to the accompanying drawings, in which:

BRIEF DESCRIPTION OF THE DRAWINGS

FIG. 6 is a schematic diagram of a display apparatus constituting a fifth embodiment of the present invention;

FIG. 8 is a schematic diagram of a display apparatus constituting a sixth embodiment of the present invention;

FIGS. 24a and 24b are schematic diagrams of a display apparatus constituting a thirteenth embodiment of the invention;

FIGS. 25a and 25b are schematic diagrams of a display apparatus constituting a fourteenth embodiment of the invention;

FIGS. 28a and 28b are schematic diagrams of a display apparatus constituting a seventeenth embodiment of the invention;

FIG. 32 shows a modification of the display of FIG. 30.

BRIEF DESCRIPTION OF THE PREFERRED EMBODIMENTS

Figure 1:
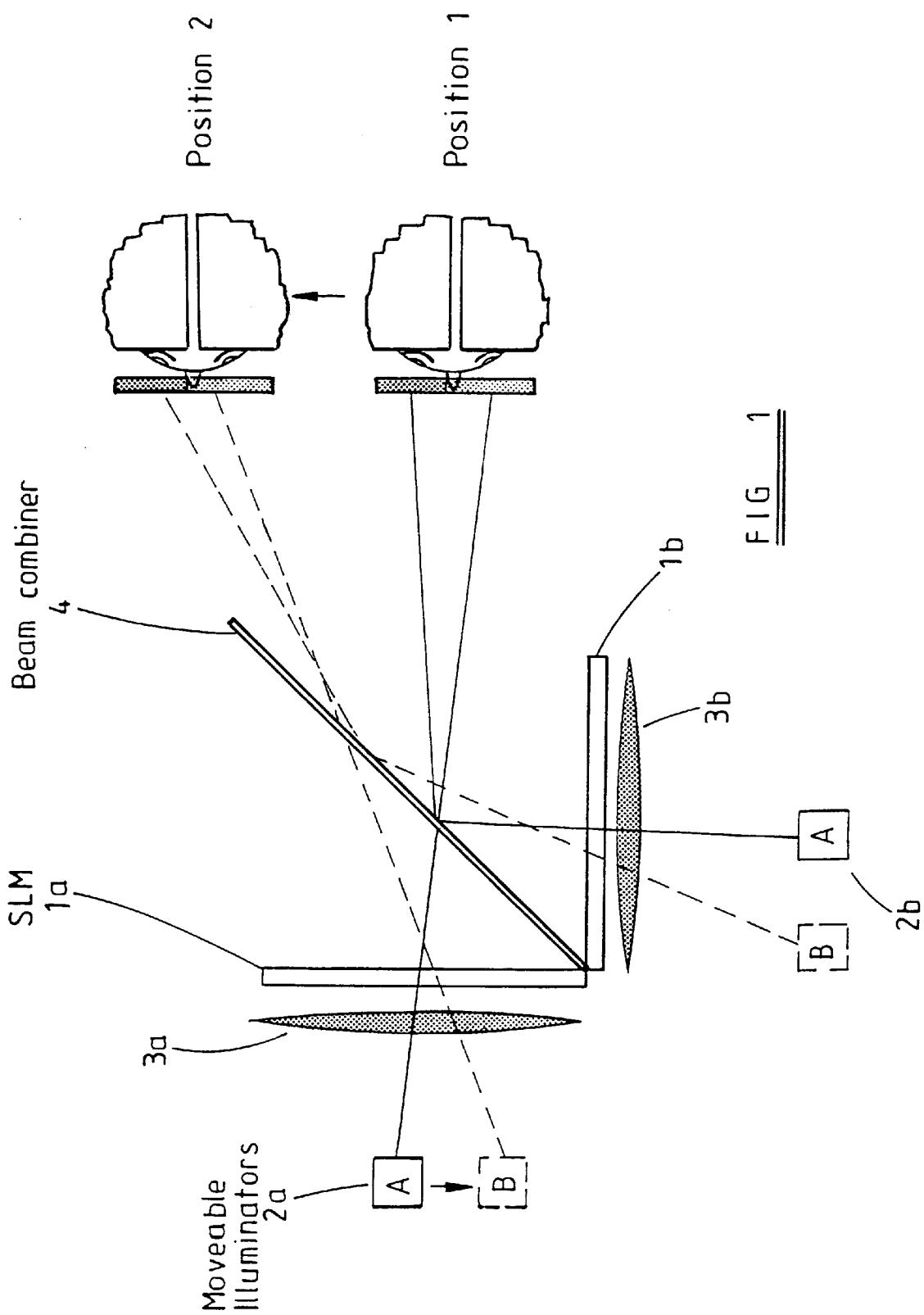
FIG. 1 is a schematic diagram of a display apparatus using a beam combiner and constituting a first embodiment of the present invention.

FIG. 1 shows a plan view of a direct view 3D display incorporating a beam combiner. First and second image data are presented to first and second spatial light modulators 1a and 1b, respectively, for production of first and second 2D images. Each of the first and second spatial light modulators 1a and 1b is illuminated by a respective movable illuminator 2a and 2b providing movable sources of illumination. Light from the illuminators 2a and 2b is directed by respective lenses 3a and 3b towards the spatial light modulators 1a and 1b. The light is intensity modulated by the spatial light modulators 1a and 1b to form two 2D images. In order to create a 3D image, the 2D images are of the same object or objects, but from different directions. The images are then combined by a beam combiner 4 to create the 3D image.

The sources of illumination 2a and 2b are arranged to produce light emanating from the positions indicated at "A" with the observer at position 1 as shown in FIG. 1. If, however, the observer moves to position 2, then the light emanates from the positions "B" in order to maintain the appearance of a 3D image. Thus the relative positions of the sources of illumination 2a and 2b with respect to the lenses 3a and 3b adjacent the SLMs 1a and 1b are controlled in response to movement of the observer. The display may be controlled so as to maintain the appearance of a 3D image in response to movement by the observer, but maintaining the same point of view. Alternatively, the image data presented to the SLMs may be modified in response to movement of the observer so as to present appropriate new views, for example to simulate movement around an object.

Figure 2:
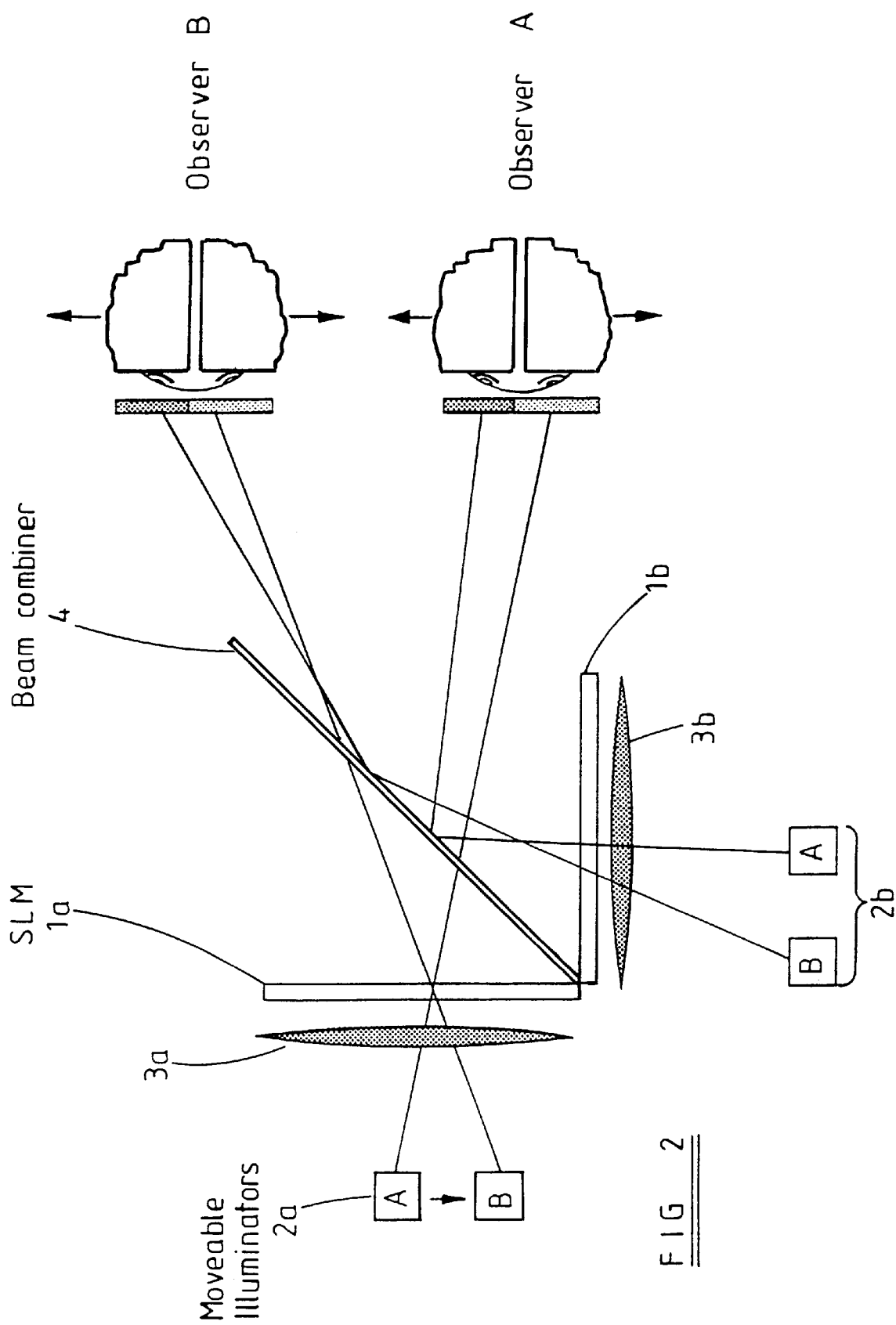
FIG. 2 is a schematic diagram showing the first embodiment in use with two observers.

The display is also suitable for use with a plurality of observers, as shown in FIG. 2. The illuminators 2a and 2b comprise a plurality of light sources arranged such that two or more light sources can be in use simultaneously. Both viewers can then view the same 3D image simultaneously and from the same point of view.

In an example embodiment, each of the spatial light modulators may be a 250 mm diagonal dimension liquid crystal device (LCD). The illuminators may be spaced 500 mm from the respective LCDs and the optical path length from the LCDs to the observer position may be nominally one metre. The illuminators may then consist of illuminator elements 32.5 mm wide (so that the window size at the observer is nominally 65 mm wide) which perform translatory movement, or which are switched on and off so as to simulate movement in a step wise manner, in response to lateral movement of the observer, at half the speed of the observer.

The optical system, i.e. the lenses 3, SLMs 1 and the beam combiner 4, make efficient use of the light available from the illuminators 2a and 2b, giving rise to a bright image.

Figure 3:
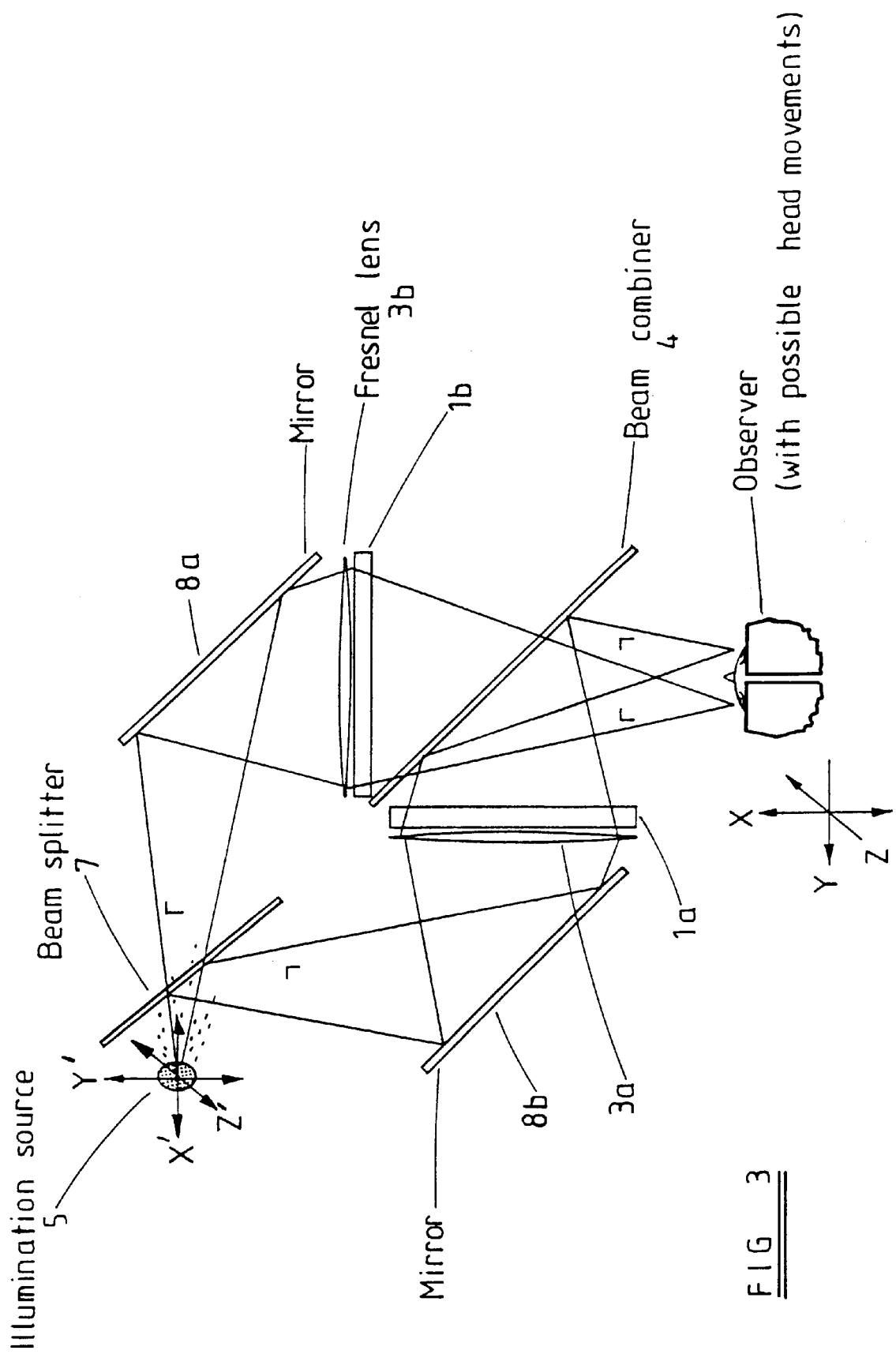
FIG. 3 is a schematic diagram of a display apparatus using a beam combiner and a single source of illumination and constituting a second embodiment of the present invention.

In an alternative arrangement, a single illuminator 5 is shared by both spatial light modulators, as shown in FIG. 3. The illuminator is arranged to undergo, or simulate, movement along at least the Y' direction so as to track observer movement laterally to the display, i.e. in the Y direction. Light from the illuminator is directed towards mirrors 8a and 8b by a beam splitter 7. The mirrors 8a and 8b reflect light from the source 5 towards the lenses, such as Fresnel lenses, 3a and 3b associated with the SLMs 1a and 1b. The illuminator may also be movable in a Z' direction so as to track vertical movement of the observer in the Z direction. The illuminator may be further arranged to undergo movement in an X' direction so as to track movement of the observer towards and away from the display in an X direction, thereby ensuring that the image plane of the light focused by the lenses 3a and 3b is controlled to track the position of the observer. Sharing of a single illuminator 5 simplifies the complexity of the illuminator position control system.

Figure 4:
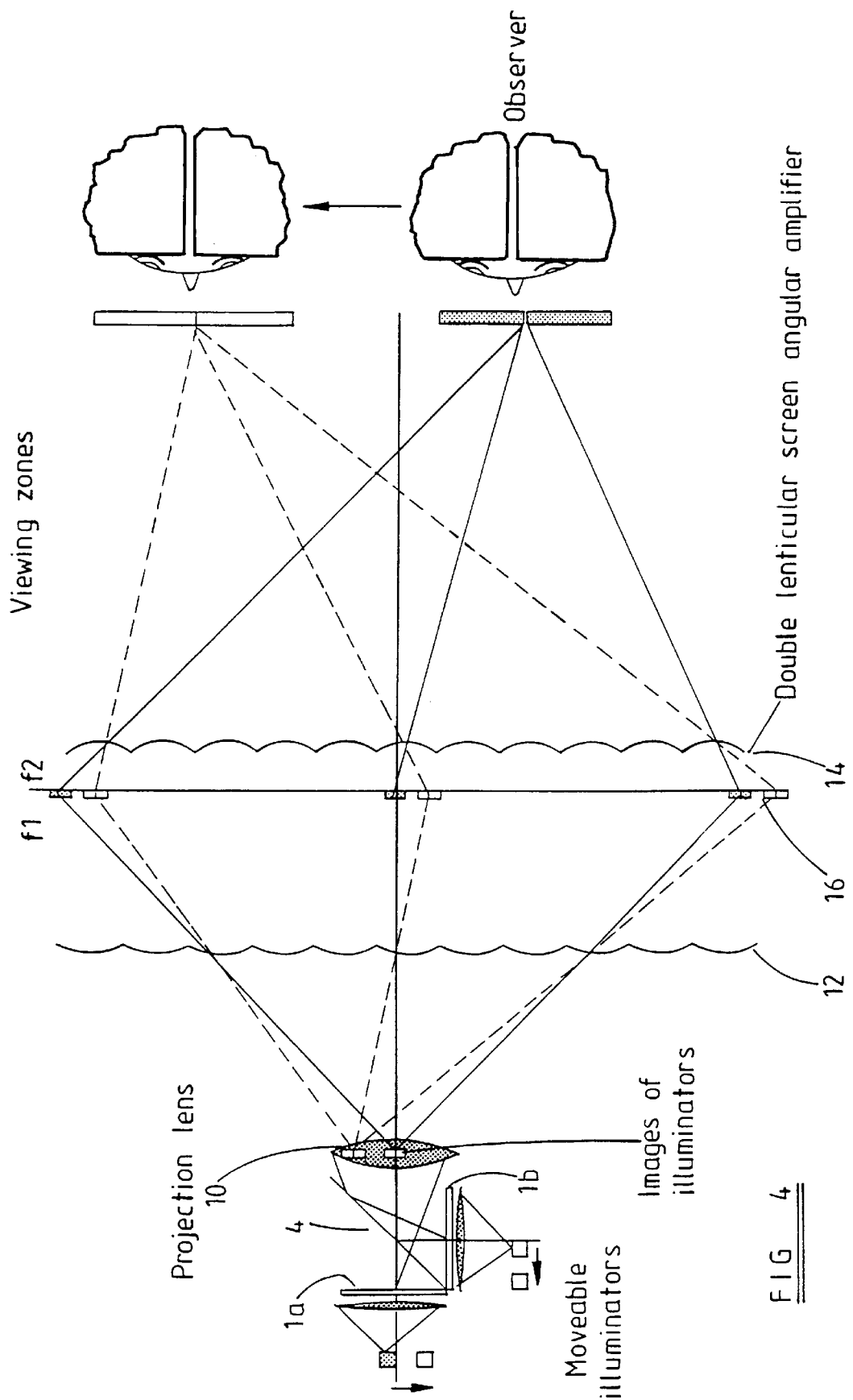
FIG. 4 is a schematic diagram of a projection display apparatus constituting a third embodiment of the present invention.

FIG. 4 shows a projection display apparatus. Apparatuses of this type are disclosed in an earlier British Patent Application No. 9323402.9. As described hereinabove, image data for two views are presented to two SLMs 1a and 1b. The SLMs spatially modulate light from respective illuminators to form two 2D images which are then combined by a beam combiner 4. However, instead of being directly viewed by the observer, the illuminators are imaged into the aperture of a projection lens 10. The total output numerical aperture defines the maximum angular extent of the output view directions when the final image screen is a lens.

However, if a combination of first and second lenticular screens 12 and 14 acting as an angular amplifying element is used as an output element, as shown, then output lobes are generated by the second lenticular screen 14 enhancing the total viewing cone of the display. The first lenticular screen 12 is arranged to form an image at a diffuser 16. The diffuser 16 lies in the object plane of the second lenticular screen 14. As with the other embodiments described hereinbefore, the positions of the illuminators are controlled so as to track the movement of the at least one observer. In an example display system, 50 mm LCD screens are imaged by an 80 mm f#1.9 projection lens to a 250 mm image size at a 3:1 angular amplifying screen. The observer distance from the screen will be 1000 mm with approximately 200 mm lateral freedom of movement.

Vertical movement can be accommodated in a number of ways. The illuminator image at the viewer plane can be vertically extended, thereby giving a wide range of possible viewing heights from which the image can be seen. The at least one illuminator may provide vertically extended sources of illumination or a vertical diffuser element may be provided at the output screen plane. Alternatively, the position of the at least one source of illumination may be moved vertically in correspondence with the movement of the observer or observers.

Tilting of the observer's head can be accommodated, in displays which do not use arrays of (cylindrical) lenticules, by tilting the or each source of illumination. However, the image has to be modified in order to maintain the 3D autostereoscopic effect. Similarly, the size of the illuminated area of the or each illuminator may be altered if the or each illuminator is moved longitudinally in response to longitudinal movement of the observer, so as to compensate for the change in the angle subtended at the observer's eyes.

Figure 5:
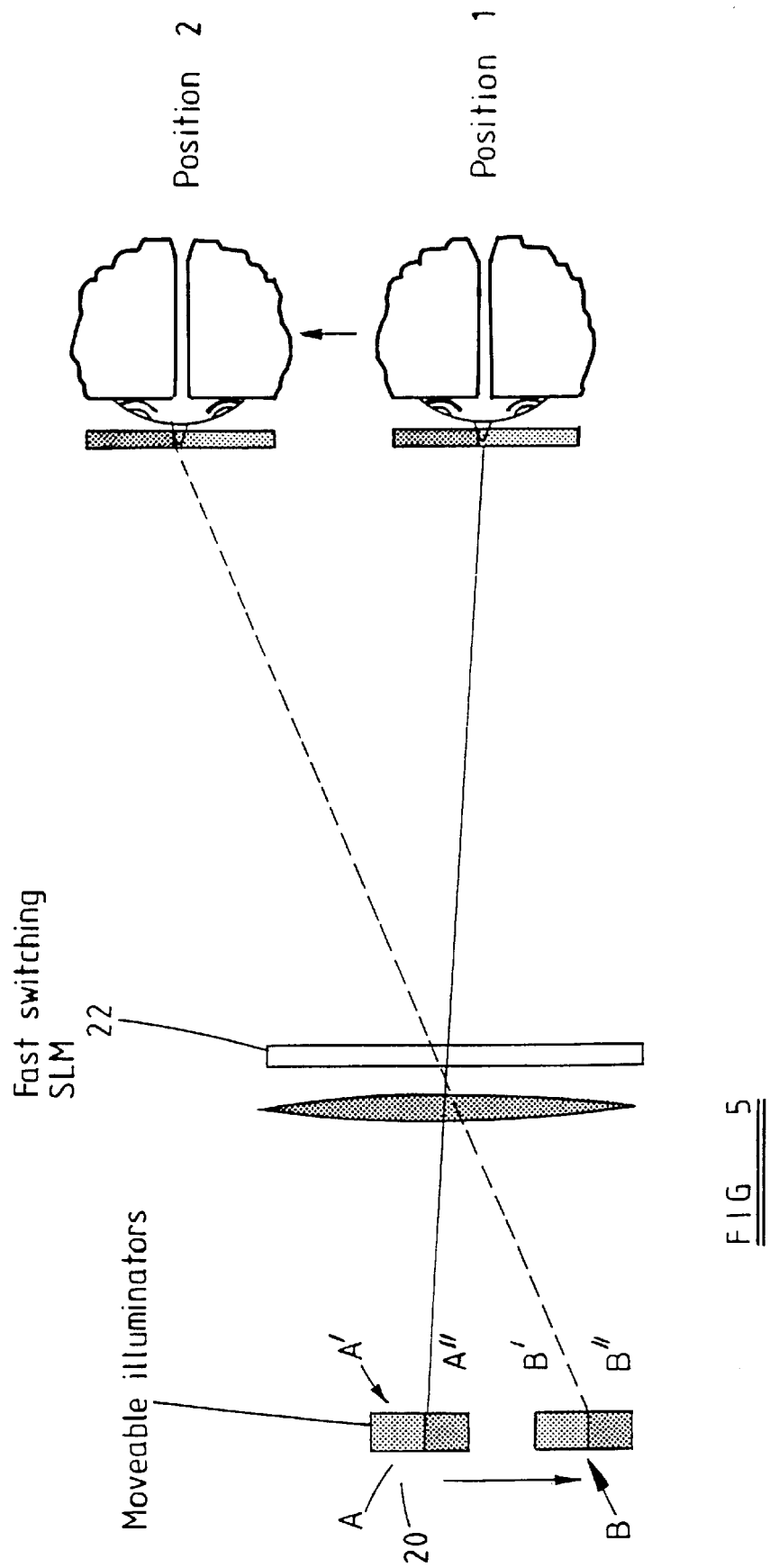
FIG. 5 is a schematic diagram of a display apparatus constituting a fourth embodiment of the present invention.

The movable illuminators can also be incorporated in a display device using time multiplexing, as shown in FIG. 5. The illuminator 20 is controlled in correspondence with the image data presented to the SLM 22 so as to present images to the left and right eyes of the observer sequentially. However, the general position of the source of illumination is also controlled in response to movement of the observer's head. Thus the illuminator is at position A so that the light comes alternately from positions A' and A" when the observer is at position 1 of FIG. 5, but the illuminator is moved to position B so that the light comes from positions B' and B" when the observer is at position 2.

FIG. 6 shows an arrangement in which a temporally multiplexed SLM 24 is interposed between the lenticular screens 26 and 28 to form the 2D images. The arrangement of the SLM and the lenticular screens is disclosed in European Patent application 93303590.9 filed May 10, 1993 entitled "OPTICAL DEVICE". The position of the illuminator 20 is controlled in correspondence with the image data presented to the SLM.

One or both of the lenticular screens may be replaced by an array of apertures. The device comprises a first two-dimensional array of lenses or apertures having a number N of groups of lenses or apertures, each of which comprises Z lenses or apertures where Z is an integer greater than one, the lenses or apertures of the first array being disposed with a pitch p in a first dimension; and a second two-dimensional array of lenses or apertures facing the first array and having a number N of lenses or apertures disposed with a pitch P in the first dimension, where P>p and each lens or aperture of the second array is associated with a respective group of lenses or apertures of the first array. The spatial light modulator comprises a plurality of modulating cells, each of which substantially corresponds to and is aligned with a respective one of the lenses or apertures of the first array.

The illuminator tracking of the observer may be achieved in a number of ways. The position of the source of illumination may be physically moved, for example by translatory movement of the source and/or by use of movable mirrors. Alternatively the source may be a CRT or a SLM used to modulate a bright extended light source so that the position from which light emanates from the source can be controlled without physically moving the position of the source. In a further alternative to be described in more detail hereinafter, the source of illumination may comprise an array of contiguous light sources which are individually controllable so as to simulate one or more than one moving light source.

Various types of tracking systems may be used so as to control the tracking of one or more observers by the display. For instance, the or each observer may communicate his position by way of an input device such as a joy stick. In another embodiment, the or each observer's position may be sensed by an ultrasonic tracking system or the or each observer may wear a magnet to indicate his position to a magnetic tracking system. In a further embodiment, one or more cameras may scan the viewing region to determine the or each observer's position, for instance supplying image data to a system which recognises the eyes of the or each observer. In yet a further embodiment, the or each observer wears a reflector which reflects electromagnetic energy, such as infrared energy. A scanning infrared source and an infrared detector or a wide angle infrared source and a scanning infrared detector determine the position of the or each reflector which is preferably worn between the eyes of the observer. In a still further embodiment, the or each observer may issue voice commands, such as UP,LEFT, HERE etc to direct the display or to allow an audio controlled tracking system to identify the position of the source of the observer's voice.

FIGS. 7a to 7f represent examples of the shape and position of the source of illumination in response to movement of an observer. The hatched areas of the source represent the area from which light is emitted. The illustration is for a temporally multiplexed display, in which the light hatching represents the area from which light is emitted for presenting an image to the left eye, and the dark hatching represents the area from which light is emitted for presenting an image to the right eye.

Figure 7A:
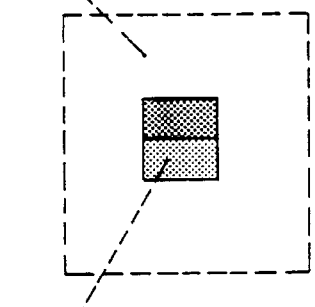
FIGS. 7a–7f are schematic representations of the illumination pattern generated by the source of illumination in response to different movements of at least one observer.
Figure 7B:
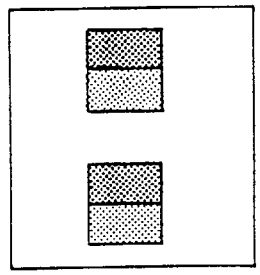
Figure 7C:
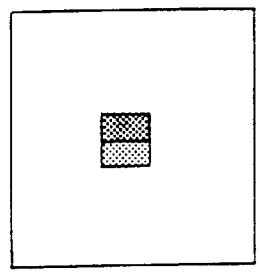
Figure 7D:
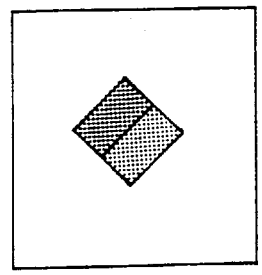
Figure 7E:
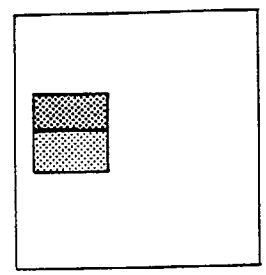
Figure 7F:
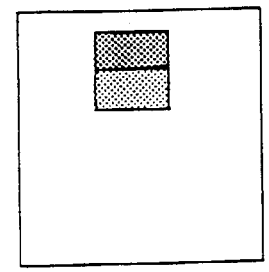

FIG. 7a shows the source position for an observer directly in front of the display. FIGS. 7b and 7c show the source position when the observer moves to the left and downwards, respectively. FIG. 7d shows the source orientation when the observer tilts his head to the left about a horizontal axis, while FIG. 7e shows the source shape when the observer has moved longitudinally. FIG. 7f represents the source when two observers are present. When the observer rotates his head about a vertical axis while looking at the display, a change in the effective interocular separation results. This can be compensated by reducing the lateral size of the illuminator elements.

The changes in size and orientation of the source of illumination can easily be produced when the illuminator comprises a SLM used to modulate an extended light source or an array of light sources.

FIG. 8 shows a display system. Image data, representing multiple views of an object 26 captured by a plurality of cameras 28 or generated by computer 30, are presented via an image controller 30 to a system controller 32. The system controller 32 is responsive to the position of an observer as determined by an observer tracking detector 34. The system controller 32 issues instructions to an illuminator position controller 36 to control the illuminators. The system controller 32 also determines which of the views are reproduced by the spatial light modulators of the autostereoscopic 3D display 38.

Figure 9:
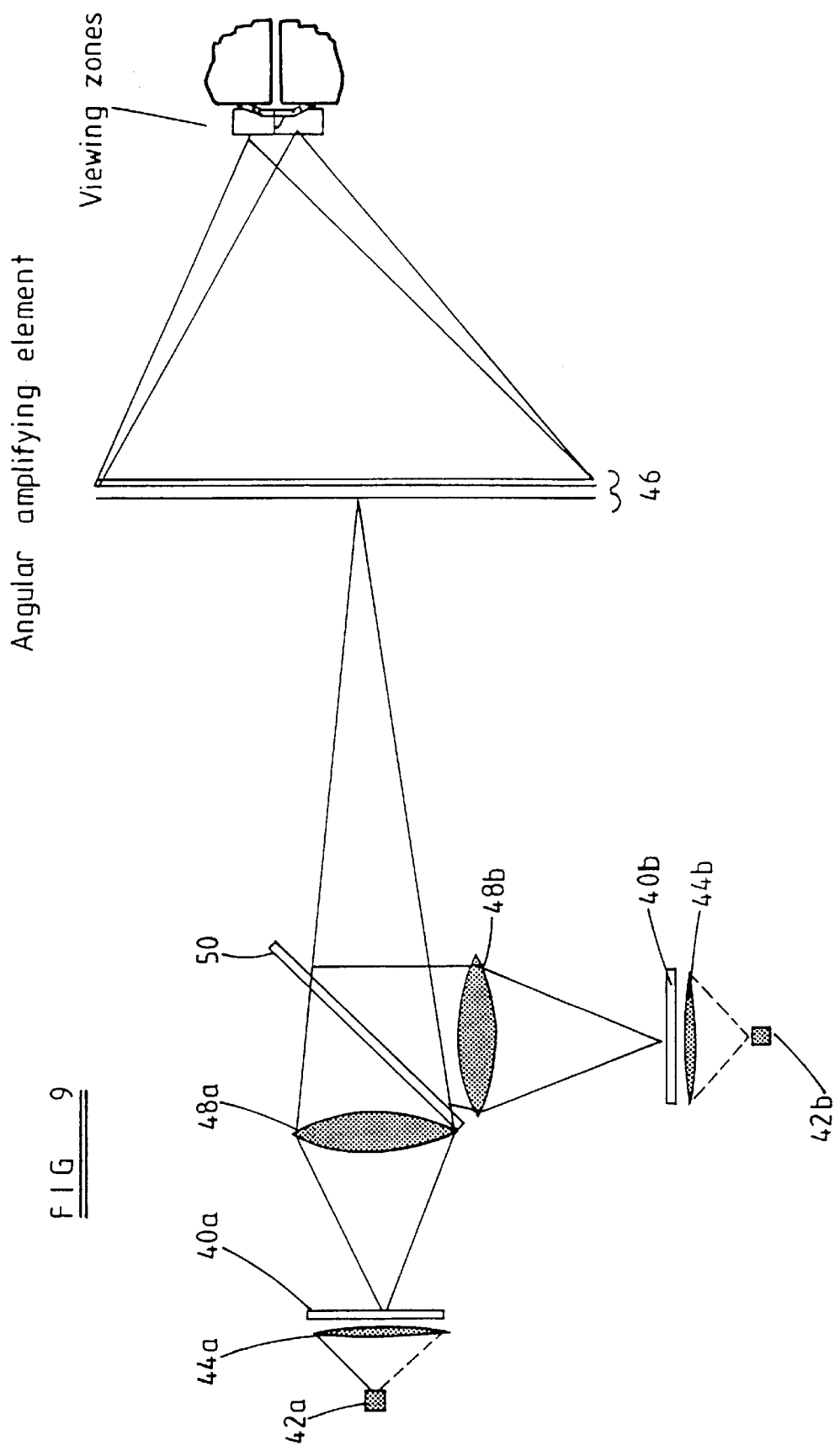
FIG. 9 is a schematic diagram of a display apparatus constituting a seventh embodiment of the present invention.

FIG. 9 shows a further embodiment of a projection display apparatus.

Image data for two views are presented to spatial light modulators 40a and 40b. Each of the spatial light modulators is illuminated by a respective movable illuminator 42a and 42b. Light from the illuminator 42a is directed onto the spatial light modulator 40a via a lens 44a. Similarly light from the illuminator 42b is directed onto the spatial light modulator 40b via a lens 44b. The images formed at the spatial light modulators 40a and 40b are imaged onto an angular amplifying element 46 (for example of the type comprising first and second lenticular screens 12 and 14 and a diffuser, as described hereinabove with reference to FIG. 4). The images are imaged through respective lenses 48a and 48b whose apertures are superimposed at a beam combiner 50. Such superimposition of the images substantially eliminates keystone distortion of the two images relative to each other. This arrangement enables two spatial light modulators to be imaged in a beam combiner configuration without the need for a projection lens having a large back working distance.

Figure 10:
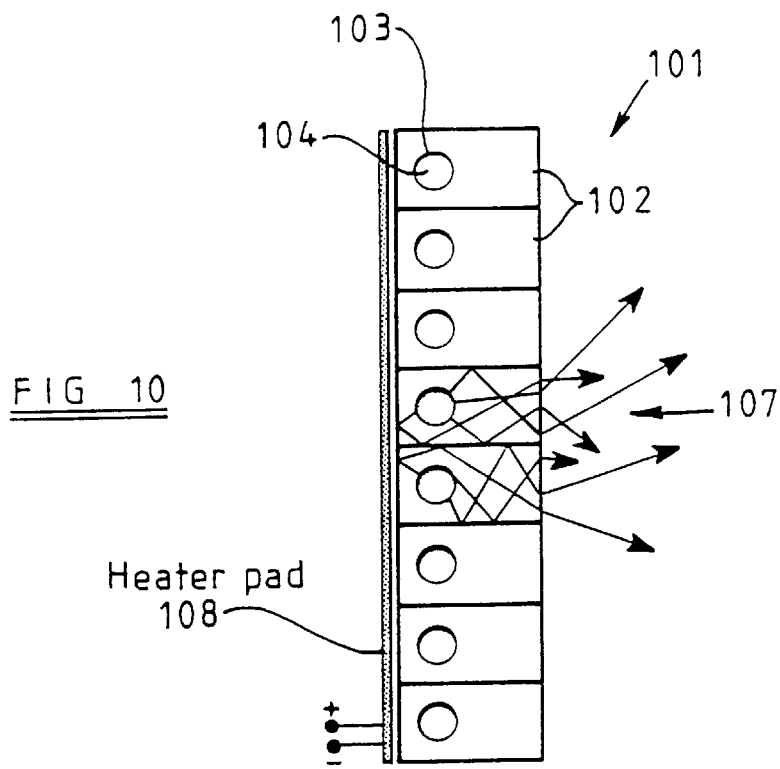
FIG. 10 shows a light source.

FIG. 10 shows an array of light sources which may be used as any of the illuminators shown in FIGS. 1 to 9. The light source array 101 comprises a plurality of optical waveguides 102, one of which is shown in more detail in FIG. 11. Each optical waveguide 102 comprises a cuboidal block of optically transmissive material. The material may comprise glass or a transparent plastics, such as perspex (RTM). Each block 102 has formed therein by drilling or moulding a cylindrical cavity 103 which contains an elongate light source 104, such as a cold cathode fluorescent tube. Other possible light sources include light emitting diodes, lasers such as laser diodes, incandescent light sources, light emitting polymers, luminescence and plasma sources.

Each block 102 has a light-emitting surface 105 shown as an optically diffusing surface formed by roughening the block surface, for instance by sand blasting, although it may comprise a smooth surface covered by a thin optical diffusing layer. The remaining surfaces 106 of the block 102 are optically reflective, for instance as a result of being coated with a thin film of reflective material. The film is preferably less than 100 micrometers thick so that, as shown in FIG. 10, the blocks 102 can be arranged as a linear array with adjacent pairs of blocks abutting against each other with a minimal gap between the surfaces 105 thereof. Thus, the light source 101 comprises a linear array of contiguous light-emitting surfaces.

The arrows 107 in FIG. 10 illustrate various light paths for light generated by the fluorescent tubes 104 in two of the blocks 102. The reflective surfaces 106 contain the light within each block 102 so that it acts as a wave guide, the light being emitted only from the surface 105. The reflective surfaces 106 therefore cause the light output from each block to be maximised and to prevent light from passing from each block 102 to an adjacent block so as to prevent "optical cross-talk".

It is desirable for variations in light output from the blocks 102 to be minimised. Cold cathode fluorescent tubes provide high brightness and efficiency with fast switching speeds but exhibit brightness variations because of their long warm-up time, which can amount to several minutes. As a result, there will be brightness differences between those tubes which have recently been switched on and those tubes which have recently been switched off. A heater pad 108 provided with a suitable temperature controller (not shown) is therefore disposed adjacent the fluorescent tubes 104 so as to maintain the temperatures of all of the tubes 104 at their normal operating temperature, which is typically about 55° C. Thus, tubes which have been switched off for a substantial time will emit substantially their full intensity immediately on being switched on.

Figure 12:
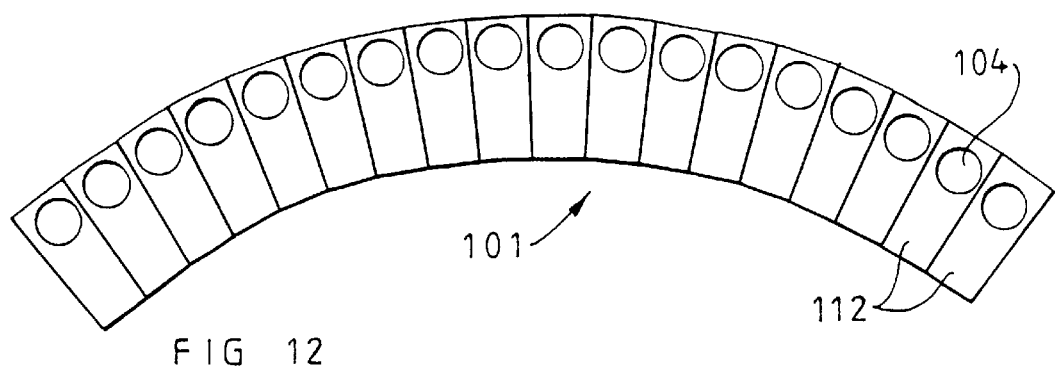
FIG. 12 shows another light source.
Figure 13:
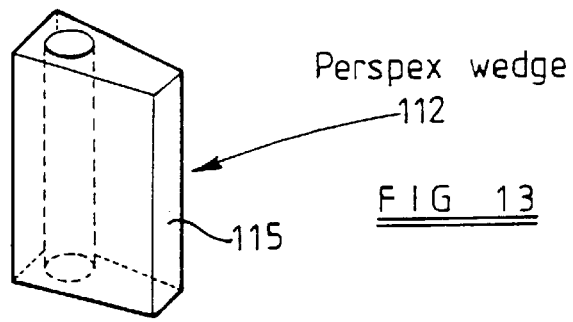
FIG. 13 shows part of the light source of FIG. 12 in more detail.

FIGS. 12 and 13 show a modified form of light source array 101 in which the cuboidal blocks 102 are replaced by wedge-shaped blocks 112. The surfaces 115 correspond to the diffusing surfaces 105 of the blocks 102 and provide the light output of the blocks 112. The remaining surfaces are coated with reflective material as in the case of the blocks 102. It is thus possible to provide a curved one dimensional light source in which the surfaces 115 of the wedge blocks 112 form or approximate part of a cylindrical or spherical surface. The surfaces 115 may be narrower than the width of the tubes 104 so as to increase the spatial resolution of the light source. Such a curved light source may be useful in overcoming field curvature aberration, for instance associated with off-axis performance of Fresnel lenses used in 3D display systems, thus increasing the field of view of such a display.

Figure 14:
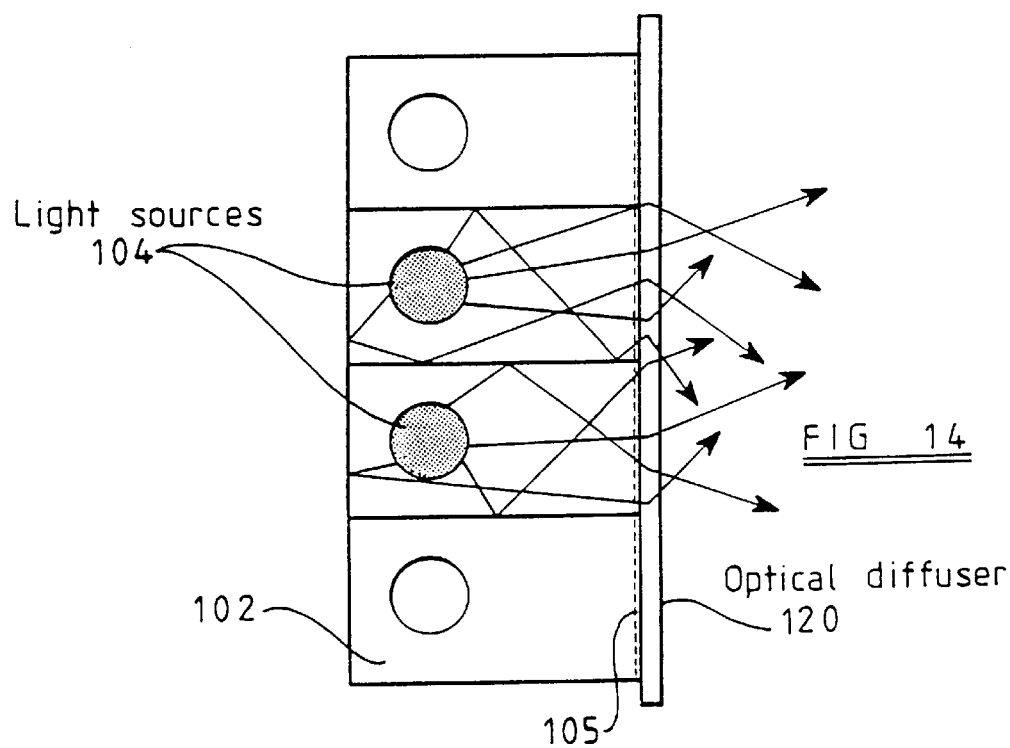
FIG. 14 shows part of the light source of FIG. 10 with the addition of an optical diffuser.

It is important for any residual gap between adjacent surfaces 105 or 115 of the blocks to be substantially invisible to the viewer. This may be at least partly achieved by carefully machining the blocks to have sharp edges at the surfaces 105 and 115 which are pressed together with only a thin reflective film separating adjacent blocks. However, in order to reduce the visibility of the gaps still further, an additional thin diffuser 120 may be disposed across the surfaces 105 of the blocks so as to allow a small amount of controlled cross-diffusion of light between adjacent blocks, as shown in FIG. 14. In addition, a layer of 3M Brightness Enhancing Film (BEF) may be used on the surface of the diffuser 120 to enhance the brightness of the source in the normal direction.

Figure 15:
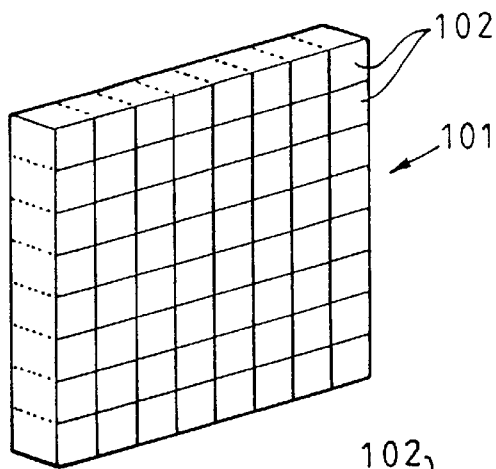
FIG. 15 shows another light source.

FIG. 15 shows a two dimensional light source array 101 comprising a plurality of blocks 102 arranged as a two dimensional contiguous array. The light sources of the individual blocks are independently controllable so as to permit any pattern of illumination to be provided. For instance, associated control circuitry may be arranged to simulate the shapes and positions illustrated in FIG. 7a to 7f.

Figure 11:
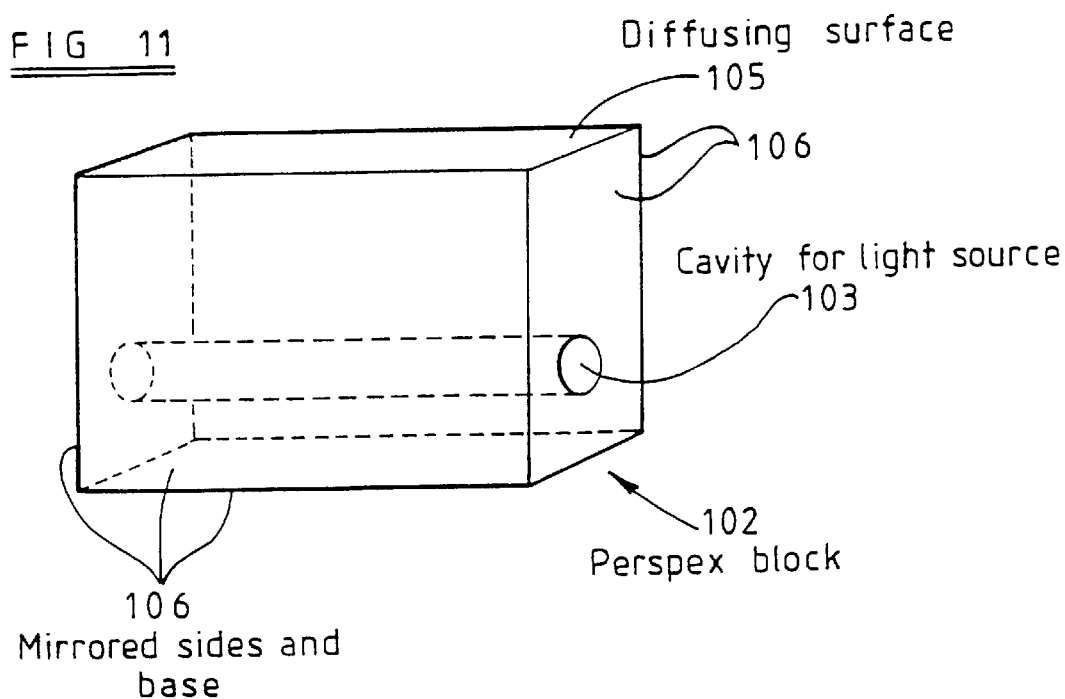
FIG. 11 shows part of the light source of FIG. 10 in more detail.
Figure 16:
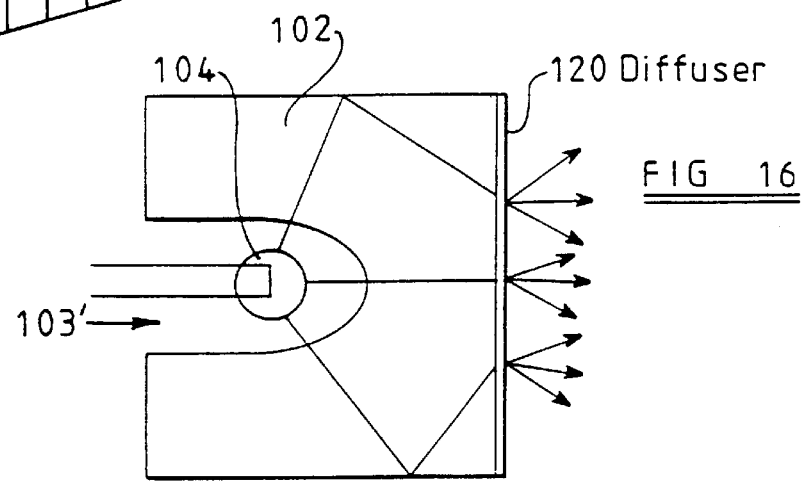
FIG. 16 shows part of a light source, for instance of the type shown in FIG. 15.

FIG. 16 illustrates a modified type of block 102 in which the fluorescent tube 104 is located within a slot 103', extending inwardly from the rear surface of the block 102, instead of in the cylindrical cavity 103 shown in FIG. 11. The surface defining the slot 103' is optically transmissive so that light from the fluorescent tube 104 is coupled into the waveguide formed by the block 102.

Figure 17:
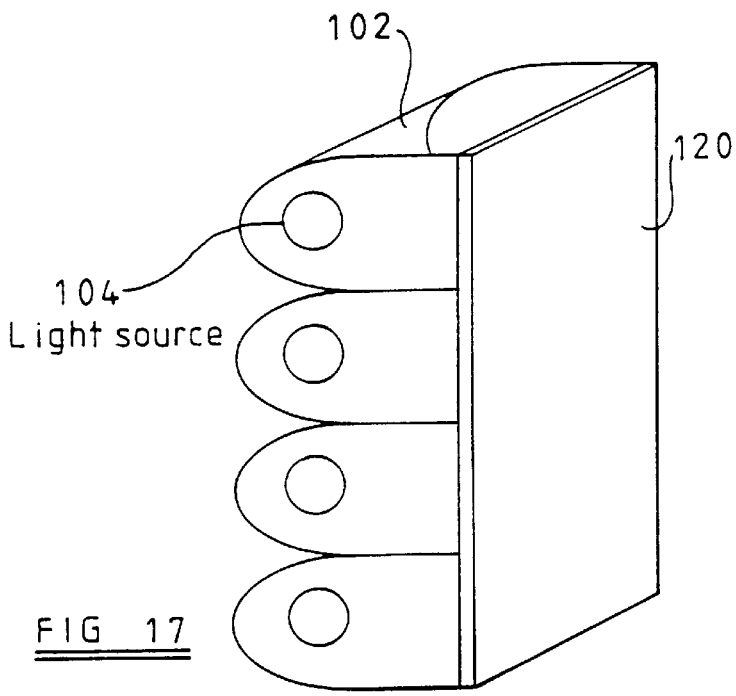
FIG. 17 shows a further light source.

FIG. 17 illustrates a light source formed from blocks 102 which differ from the type shown in FIG. 11 in that the rear surface of each block is curved. Such an arrangement may be used to improve the uniformity of output brightness of the wave guide element.

Figure 18:
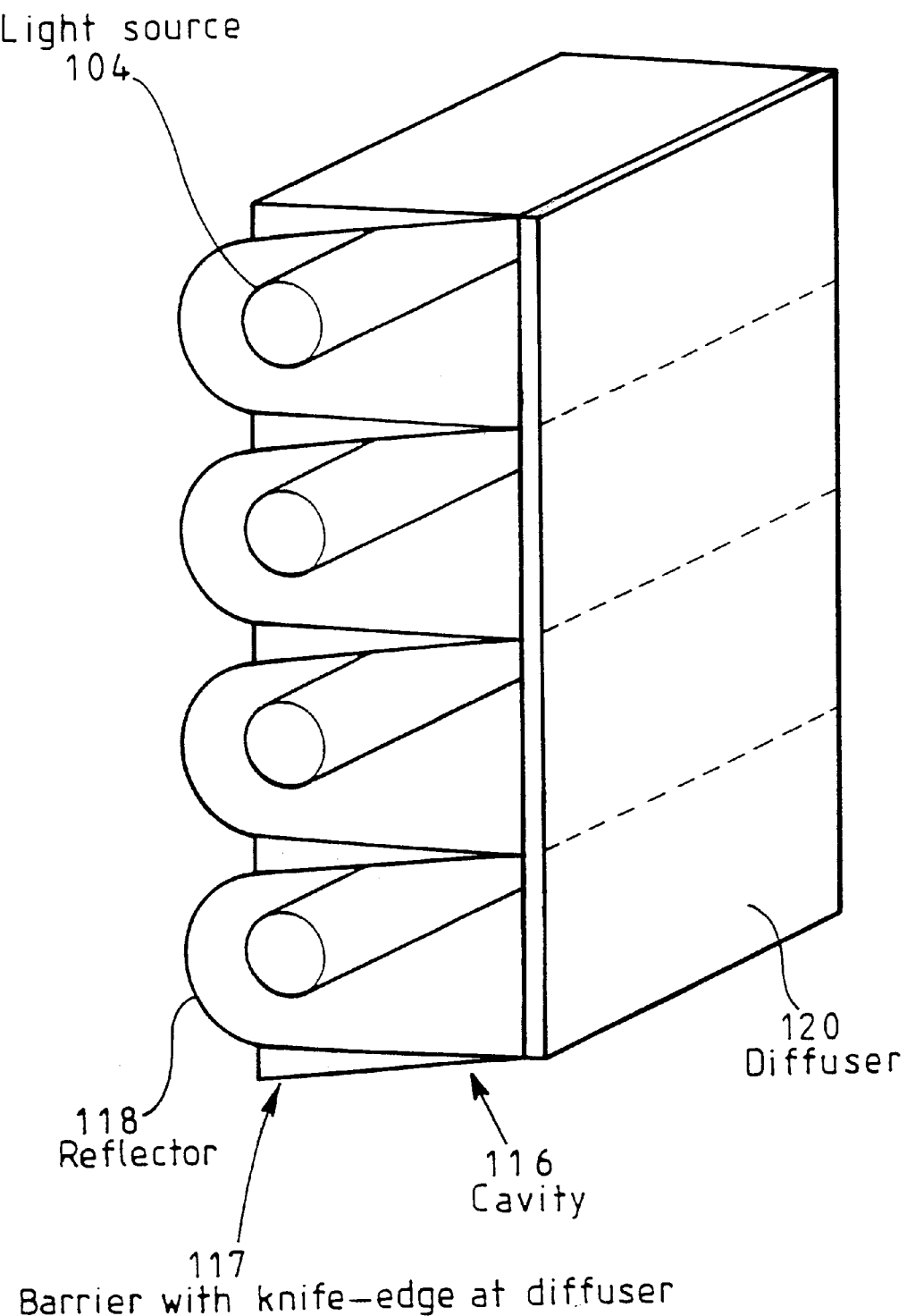
FIG. 18 shows yet a further light source.

The light source array shown in FIG. 18 is of a similar configuration to that shown in FIG. 17 but differs in that the essentially solid perspex (RTM) blocks 102 are replaced by "air filled waveguides" enclosing cavities 116. The cavities are defined by opaque barriers 117 having knife-edges at the diffuser 120 and by opaque end barriers (not shown). The barriers have reflective surfaces and the rear of each cavity 116 is defined by a cylindrically or parabolically curved reflector 118.

The perspex blocks 102 and 112 shown in FIGS. 10 to 14 may likewise be replaced by air filled wave guides.

Figure 19:
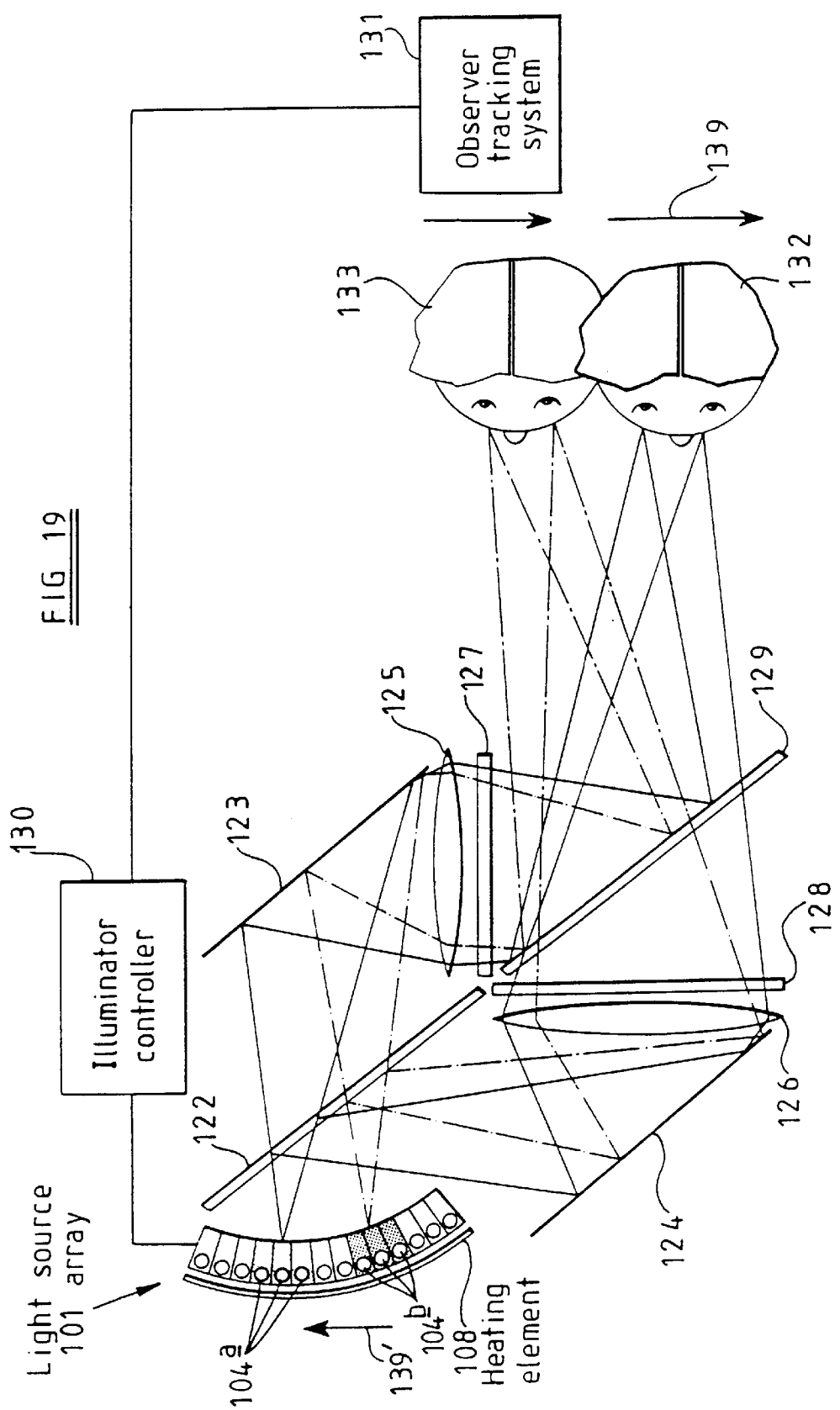
FIG. 19 is a schematic diagram of a 3D display apparatus constituting an eighth embodiment of the invention and including a light source as shown in FIG. 12.

FIG. 19 shows the use of the light source 101 of FIGS. 12 and 13 in the display of in FIG. 3 in place of the illumination source 5. The light source 101 supplies light to a beam splitter 122 which transmits substantially half of the light to a mirror 123 and reflects substantially half of the light to a mirror 124. The mirrors 123 and 124 reflect the light through Fresnel lenses 125 and 126 and SLMs 127 and 128, respectively. The light rays modulated by the SLMs 127 and 128 are then combined by a beam combiner 129 such that an image formed on the SLM 127 is visible to the right eye of an observer and an image formed on the SLM 128 is visible to a left eye of the observer. The Fresnel lenses 125 and 126 form images of the light source 101 at the right and left eye positions, respectively, of the observer.

The individual fluorescent tubes of the light source array 101 are controlled by an illuminator controller 130 which in turn is controlled by an observer tracking system 131. The observer tracking system 131 is arranged to track the position of the observer and to cause the illuminator controller 130 to switch on those fluorescent tubes which result in images of the surfaces 115 of the corresponding blocks 112 being formed at the positions of the eyes of the observer. For instance, with the observer located at the position 132, the fluorescent tubes 104a are illuminated and typical ray paths for the light from the corresponding blocks are shown by the continuous lines. When the observer moves to position 133, the observer tracking system 131 detects the change in position and causes the illuminator controller 130 to extinguish the tubes 104a and to light the tubes 104b. Typical ray paths are illustrated by the chain dot lines in FIG. 19.

Alternatively, in order to allow two observers to see autostereoscopic images simultaneously, for instance at the positions 132 and 133, both sets of tubes 104a and 104b may be illuminated simultaneously. The observer tracking system 131 may further be arranged to track the positions of both observers and to cause the illuminator controller 130 to illuminate those tubes 104 which cause autostereoscopic images to be observable by both observers within the range of movement permitted by the display.

Figure 20:
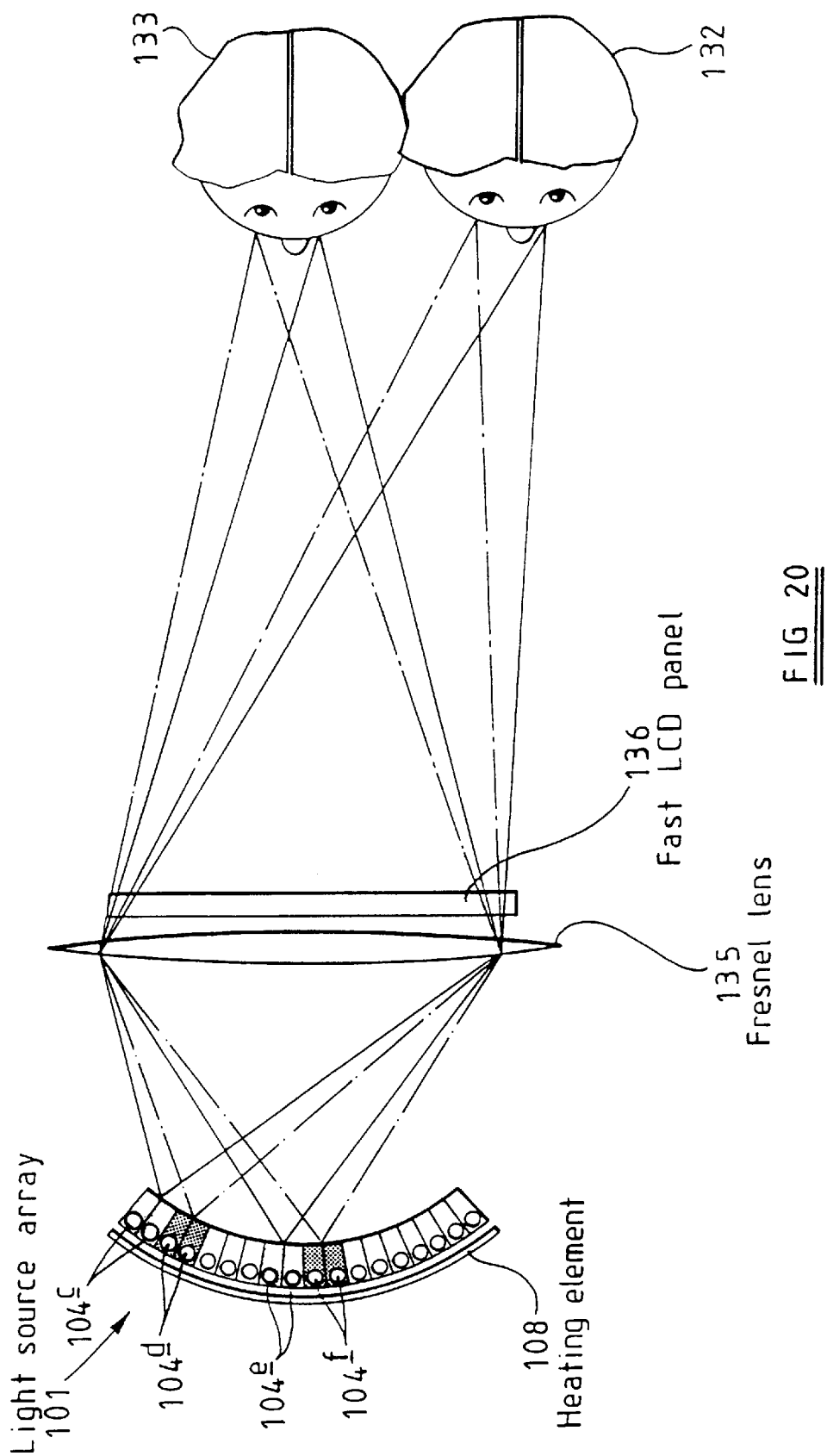
FIG. 20 is a schematic diagram of a display apparatus constituting a ninth embodiment of the invention and including a light source as shown in FIG. 12.

FIG. 20 illustrates the use of the light source array 101 in a temporally multiplexed display of the type shown in FIG. 5. With the observer at the position 132, light from the tubes 104c is imaged by a Fresnel lens 135 through a SLM in the form of a fast liquid crystal device (LCD) panel 136 at the left eye of the observer (as shown by continuous lines) whereas light from the tubes 104d is imaged at the right eye (as shown by the chain dot lines). When the observer is at the position 133, the tubes 104e and 104f are illuminated. With the observer at the position 132, the tubes 104c are first illuminated and other tubes are switched off. A left eye image is presented to the LCD panel 136 and is seen by the left eye of the observer. The tubes 104c are then extinguished and the tubes 104d are illuminated while the image data have been changed to represent a right eye image which is seen by the right eye of the observer at the position 132. This sequence is repeated with a repetition rate sufficiently high to prevent the visibility of flicker so that the observer sees an autostereoscopic 3D image.

As the observer moves, for the instance from the position 132 to the position 133, the active tubes 104 change from 104c and 104d to 104e and 104f continuously so that, within the range of permissible viewing positions, the observer sees the same autostereoscopic 3D image.

Alternatively, as in the case of FIG. 19, two sets of tubes 104c, 104d and 104e, 104f may be active simultaneously so as to permit two observers to see the same autostereoscopic 3D image at different observer locations. For instance, when the observers are at the positions 132 and 133, the tubes 104c and 104e are switched in synchronism and the tubes 104d and 104f are switched in synchronism. Both observers can be independently tracked and the appropriate tubes 104 activated in synchronism with the image data presented to the LCD panel 136.

Figure 21:
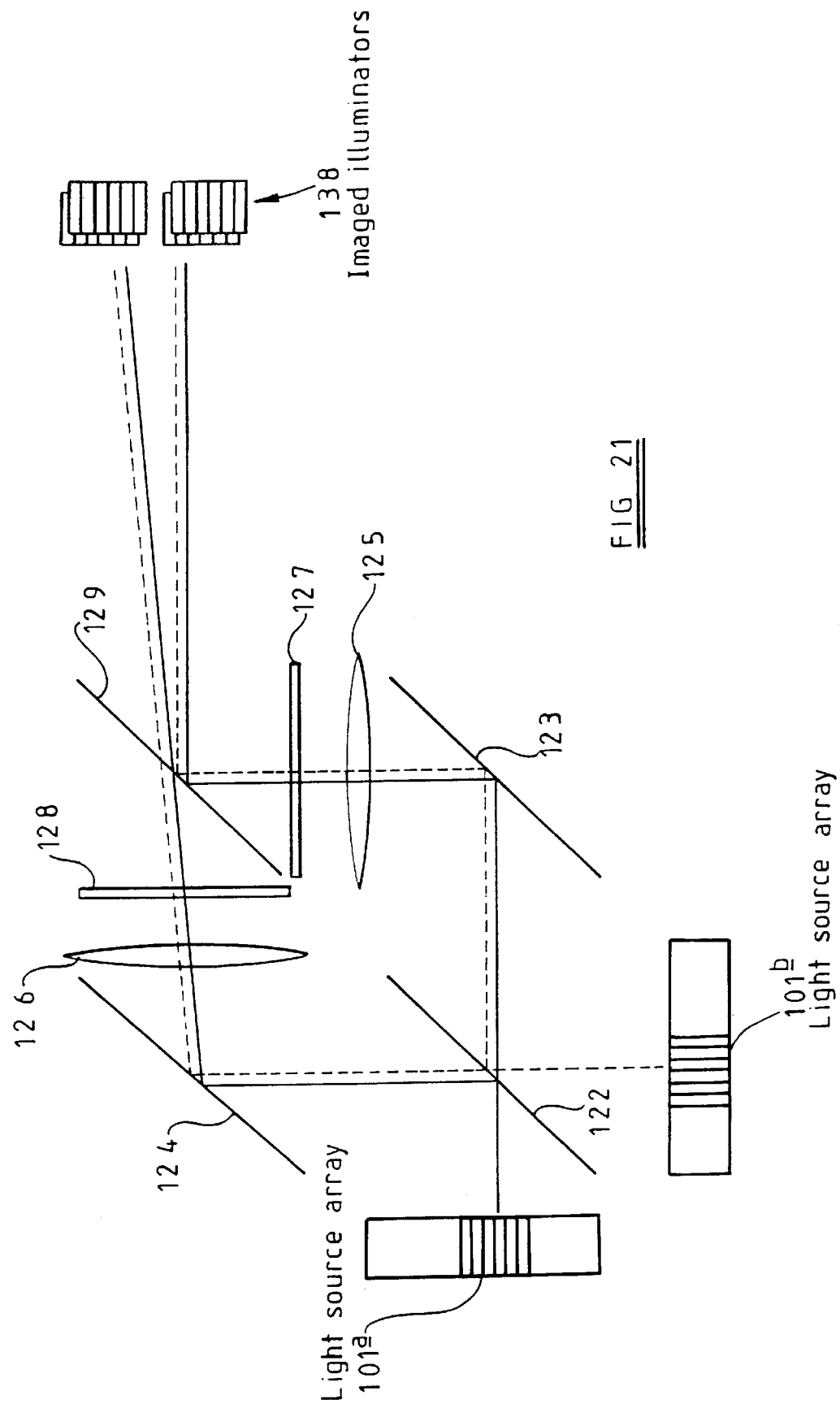
FIG. 21 is a schematic diagram of a display apparatus constituting a tenth embodiment of the invention and including two light sources as shown in FIG. 10.

FIG. 21 shows an autostereoscopic 3D display of a type similar to that shown in FIG. 19 but in which two light source array 101a and 101b are provided. The light from the light source arrays 101a and 101b is divided by the beam splitter 122 with the path of light from the source array 101a being shown by continuous lines and that from the source array 101b shown by broken lines. The light source arrays 101a and 101b are disposed in positions such that the images, shown at 138, overlap each other by half the pitch of the blocks 102 or 112 of the light sources. Thus, such an arrangement provides a higher light intensity for the display and doubles the effective resolution of the individually illuminatable elements of the light source. Further, any gap between adjacent surfaces 102 or 112 of one light source array will be covered by the light from one of the surfaces 102 or 112 of the other light source array so that such gaps are less visible.

The tubes 104 of the light sources are individually controllable and may be switched on and off in order to represent any desired type of light source. In the case of a single tracked observer, there are always several tubes 104 in adjacent blocks which are simultaneously illuminated. As an observer moves, for instance to the left as shown by an arrow 139 in FIG. 19, it is necessary for the light source effectively to move in the direction of the arrow 139'. This is achieved by switching off the tube at one end of the group of illuminated tubes and switching on the tube adjacent the other end. Thus, as an observer moves, an autostereoscopic 3D image is continuously visible. The light source array 101 therefore effectively simulates a movable light source but requires no moving parts. As described hereinbefore, in order for two or more observers to see simultaneously the 3D image, two or more groups of tubes 104 may be simultaneously illuminated or controlled with the illuminated groups tracking the observers independently of each other.

In a typical example of a light source array of the type shown in FIG. 10, the fluorescent tubes 104 are 4 mm in diameter and the blocks 102 are 8 mm wide. An array of 24 blocks therefore provides a light source having a total width of 192 mm. When used in a beam combiner display of the type shown in FIG. 19, it is required to produce two images of the light source 64 mm wide separated by 64 mm at the observer. For Fresnel lenses 125 and 126 arranged to provide a magnification of 2:1, four tubes can be illuminated so that the illumination width at the light source is 32 mm. The maximum range of movement of the observer is then 384 mm and the tubes must be switched progressively for approximately each 16 mm of movement of the observer in order to obtain smooth viewing freedom of movement of the observer.

Figure 22:
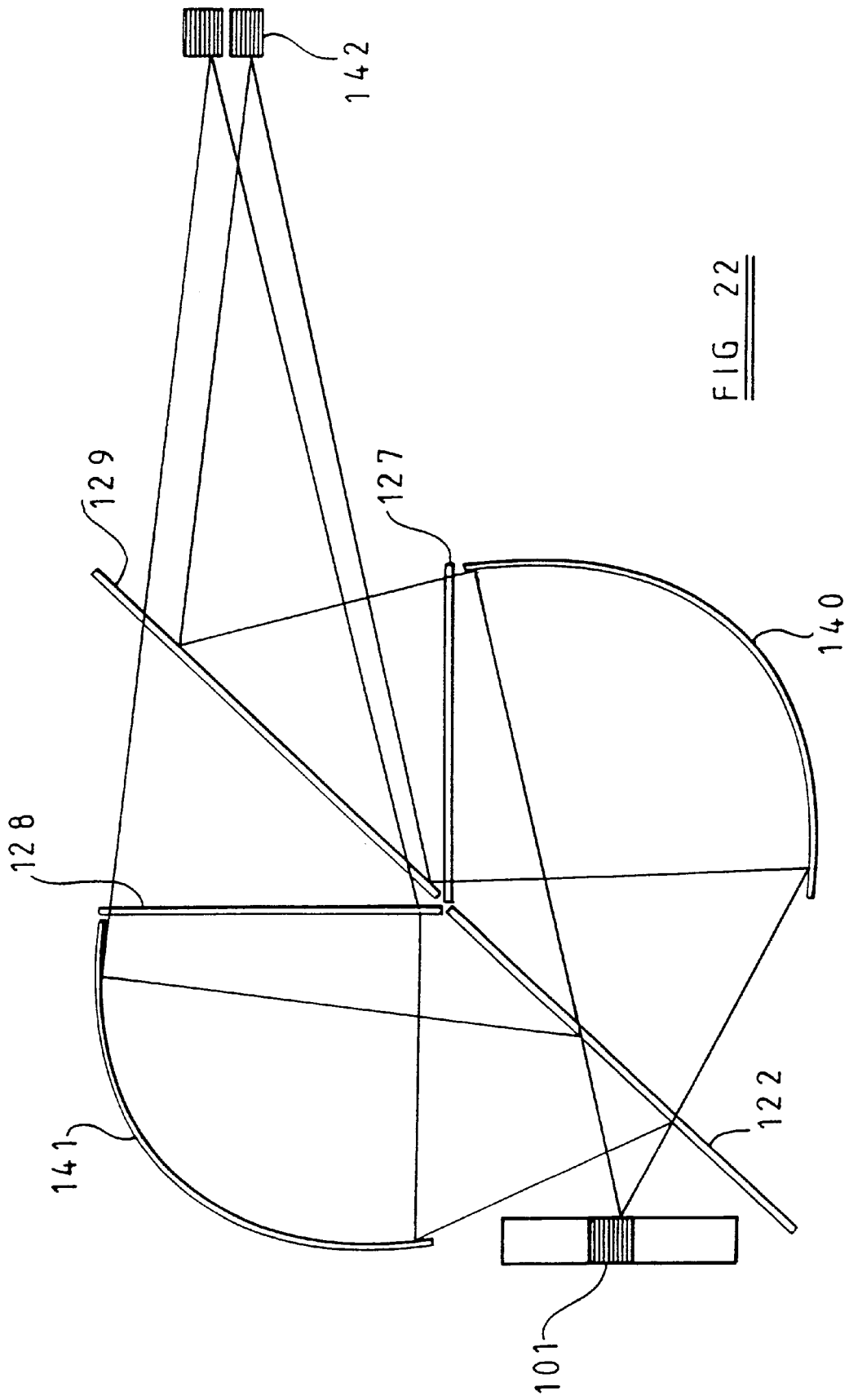
FIG. 22 is a schematic diagram of a display apparatus constituting an eleventh embodiment of the invention and including a light source as shown in FIG. 10.

FIG. 22 shows an autostereoscopic 3D display of a type similar to that shown in FIG. 19. However, the mirrors 123 and 124 and the lenses 125 and 126 are replaced by mirrors 140 and 141. Each of the mirrors 140 and 141 comprises a spherical or aspherical mirror which deflects the light from the light source array 101 through the corresponding SLM 127 or 128 and forms an image of the light source array 101 at an observer location 142. The reflecting surfaces of the mirrors 140 and 141 may additionally incorporate a diffractive pattern so as to produce a hybrid reflective/diffractive element with the focusing power shared between the reflection and the diffraction. This allows an improved optical performance to be obtained together with a larger effective aperture. In addition, the back working distance of the display may be reduced so as to make the display more compact.

Figure 23:
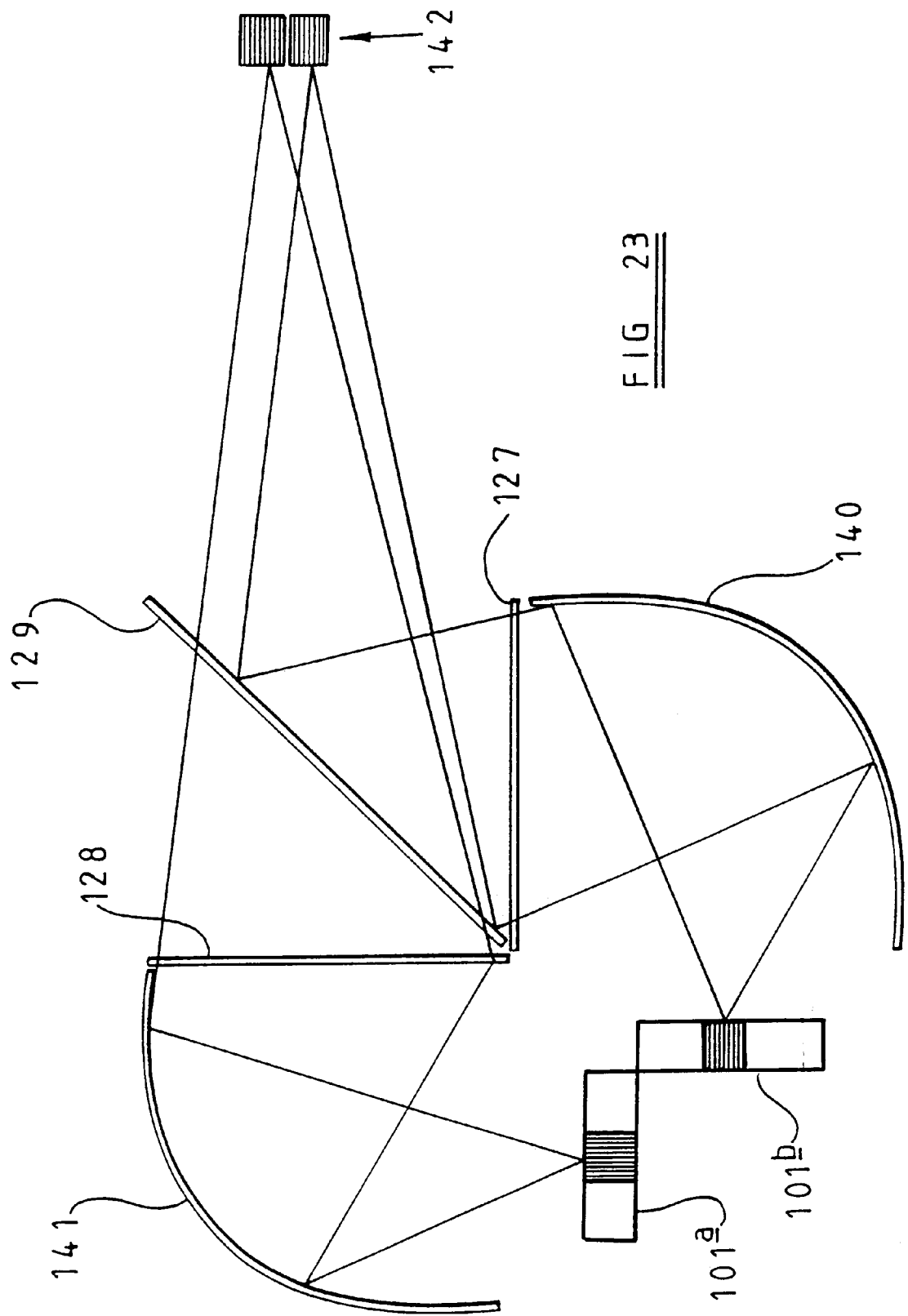
FIG. 23 is a schematic diagram of a display constituting a twelfth embodiment of the invention and including two light sources as shown in FIG. 10.

FIG. 23 shows an autostereoscopic 3D display similar to that shown in FIG. 22 but in which the light source array 101 and the beam splitter 122 are replaced by two light source array 101a and 101b.

FIGS. 24a and 24b show another temporally multiplexed display similar to that shown in FIG. 5. The display comprises a SLM in the form of a liquid crystal device 260 associated with a lens 261, such as a converging Fresnel lens. An illumination source 262 comprises an extended light source (not shown) in the form of a back light in front of which is disposed a shutter array 263 in the form of a low resolution liquid crystal spatial light modulator. The shutter array 263 is controlled by means for tracking the position of an observer (not shown). Alternatively, the illumination source 262 may comprise an array of contiguous independently controllable light sources, for instance of the type shown in FIGS. 10 to 18.

In use, the shutter array 263 is controlled so that elements 264 and 265 are transparent whereas the other elements of the array 263 are opaque. Thus, the transparent elements 264 and 265 together with the back light comprise a light source which is imaged by the lens 261 to a region 266 at which the left eye 267 of an observer is located. The light from the elements 264 and 265 is modulated by the liquid crystal device 260 so as to present a left image of a 3D image to the left eye 267 of the observer.

The elements 264 and 265 are then controlled so as to be opaque and the elements 268 and 269 are made transparent so as to act as another light source. Light from the elements 268 and 269 is imaged by the lens 261 to a region 270 at which the right eye 271 of the observer is located. The light is modulated by the liquid crystal device 260 in accordance with a second image of the 3D image to be viewed by the right eye 271. This cycle of events is then repeated at a sufficiently rapid rate to make flicker imperceptible to the observer so that the display provides an autostereoscopic 3D image by temporal multiplexing.

FIG. 24b illustrates operation of the display when the observer has moved in the direction of arrow 272. In order to track the observer smoothly and ensure that the observer continues to see an autostereoscopic 3D image, the shutter array elements 273 and 264 are imaged at the left eye 267 whereas the shutter elements 265 and 268 are imaged at the right eye 271. Thus, light from the shutter elements 273 and 264 is modulated by the device 260 with the left image whereas light from the shutter elements 265 and 268 is modulated by the device 260 with the right image. The shutter array 263 and back light thus simulate movement of the source of illumination in the direction of arrow 274 so as to track movement of the observer.

The display shown in FIGS. 25a and 25b is similar to that shown in FIGS. 24a and 24b but using a shutter array 263 of lower resolution.

In this case, in FIG. 25a with the eyes 267 and 271 of the observer in the position shown, only the shutter element 275 is imaged by the lens 261 at the left eye 267 whereas the shutter elements 276 and 277 are imaged at the right eye 271. When the observer moves in the direction of the arrow 272 as shown in FIG. 25b, the shutter elements 276 and 278 are controlled so as to provide light imaged at the left eye 267 whereas only the element 276 is controlled to provide light imaged at the right eye 271.

Figure 26A:
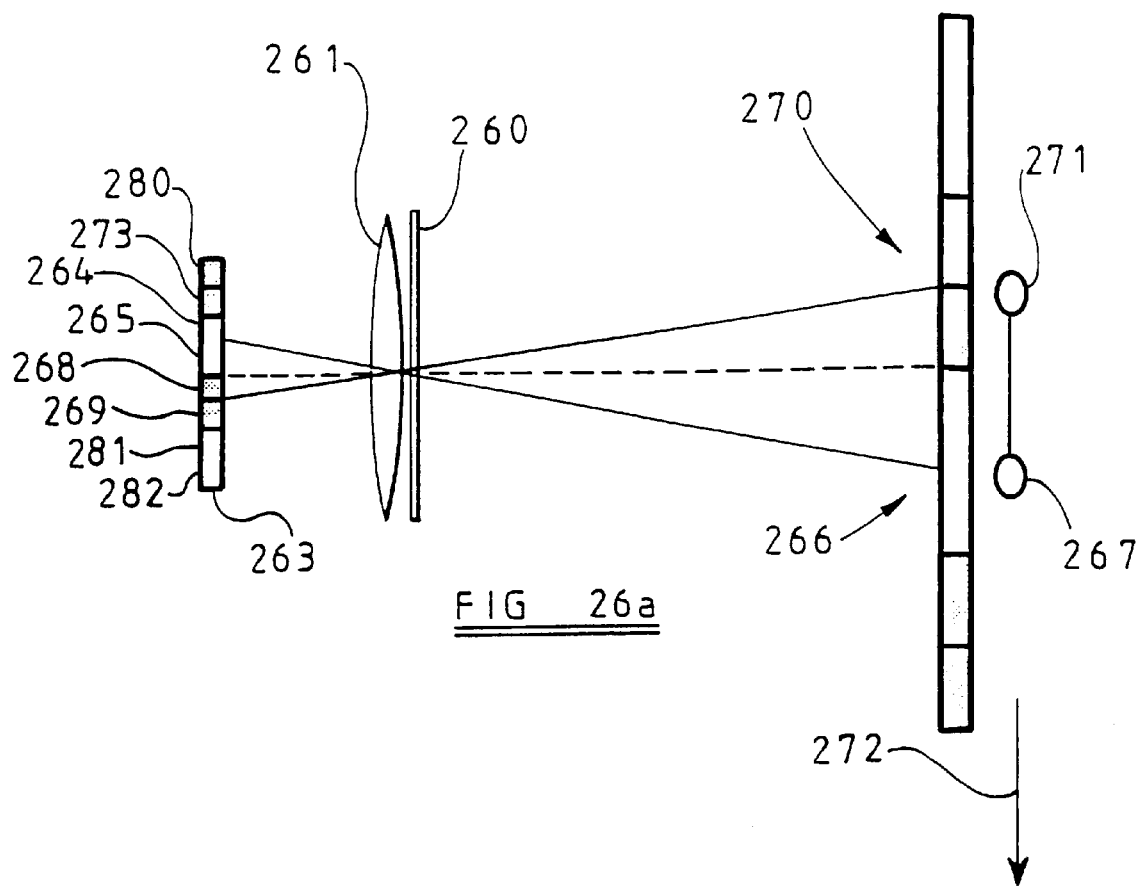
FIGS. 26a and 26b are schematic diagrams of a display apparatus constituting a fifteenth embodiment of the invention.
Figure 26B:
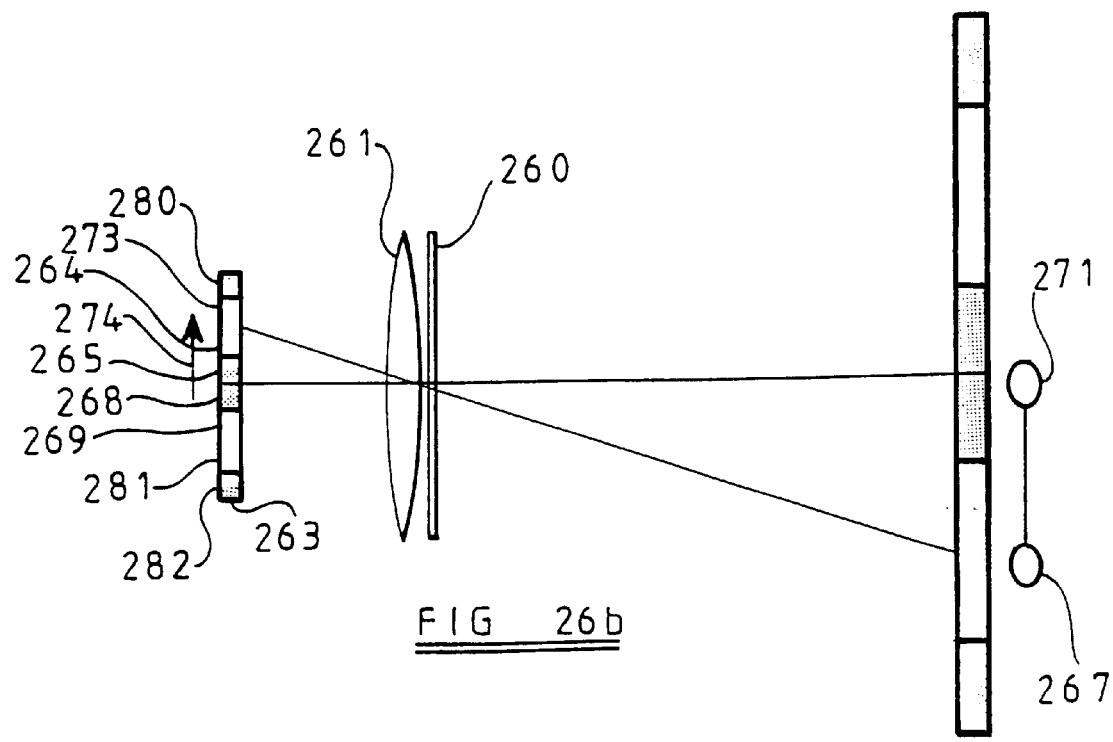

FIGS. 26a and 26b show a display of the type shown in FIGS. 24a and 24b but with the shutter array 263 operated differently such that all of the shutter elements are strobed continuously. In particular, with the observer in the position shown in FIG. 26a, the shutter elements 273 and 280 are operated in synchronism with the shutter elements 268 and 269 whereas the shutter elements 281 and 282 are operated in synchronism with the shutter elements 264 and 265. Such an arrangement helps to reduce storage effects which may be present in certain types of liquid crystal device if switched to one state for a long time, as is likely for shutter elements disposed further away from the axis of the display. In displays where the light sources are themselves switched, such as the sources illustrated in FIGS. 10 to 18, continuous switched operation of all the light sources helps to reduce the effects of lifetime degradation of the brightness of the sources. If more than one observer is present, then different parts of the shutter array 263 may be controlled in the same way for each observer.

FIG. 26b illustrates operation when the observer has moved in the direction of the arrow 272. In this case, the shutter elements 280, 265, 268, and 282 are controlled in synchronism and the remaining shutter elements 273, 264, 269, and 281 are operated in synchronism.

Figure 27A:
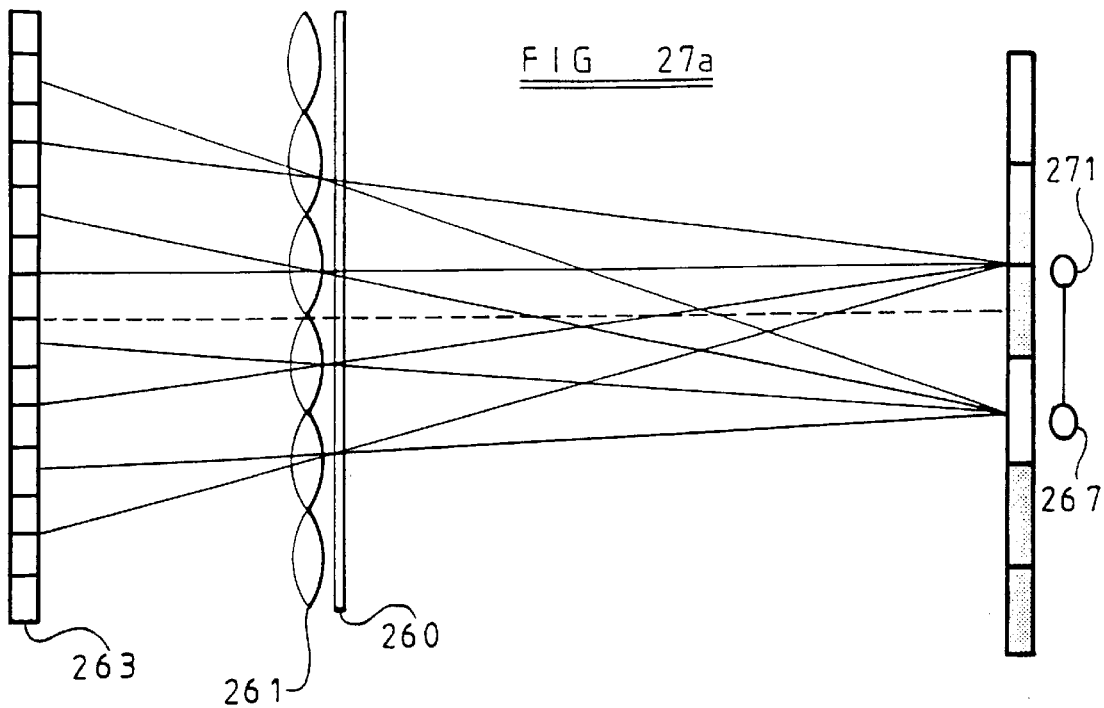
FIGS. 27a and 27b are schematic diagrams of a display apparatus constituting a sixteenth embodiment of the invention.
Figure 27B:
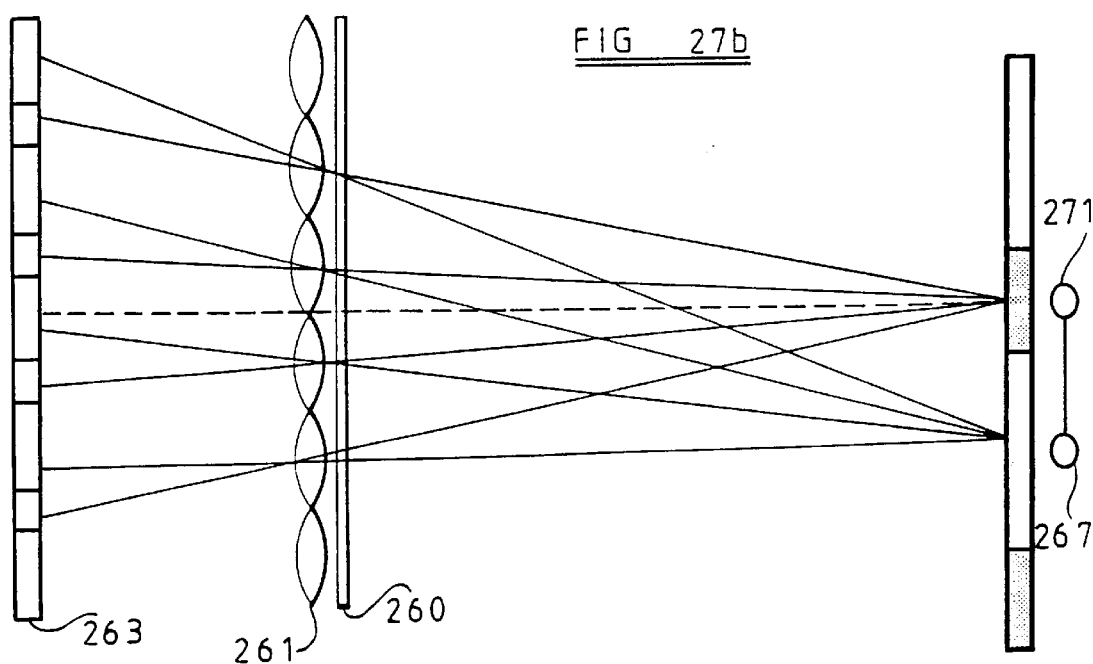

FIGS. 27a and 27b illustrate the mode of operation as illustrated in FIGS. 26a and 26b in the case of a lower resolution shutter array 263 of the type illustrated in FIGS. 25a and 25b. In particular FIGS. 27a and 27b show a compact type time multiplexed display using an array of lenses and using higher resolution shutter elements than those shown in FIGS. 24a to 26b, with a respective group of "illuminators" for each lens. As in the display shown in FIGS. 25a and 25b, the effective illumination elements are of different sizes for the left and right eyes 267 and 261.

FIGS. 28a and 28b show an autostereoscopic 3D display of a type similar to that shown in FIG. 1 but including illumination sources of the type shown in FIGS. 27a and 27b comprising extended light sources (not shown) and shutters 263a and 263b. Alternatively, the light sources may be of the type shown in FIGS. 10 to 18. Light passes through the shutter 263a for the right image whereas light passes through the shutter 263b for the left image. Light is supplied continuously through the shutters 263a and 263b so that the light paths therefrom are modulated by right and left images supplied to liquid crystal spatial light modulators 260a and 260b, respectively. Two converging lens arrays 261a and 261b are provided for imaging the effective light sources at the right and left eyes 271 and 267, respectively. The left and right images are combined by means of a beam combiner 285.

FIG. 28b illustrates the change in operation of the shutters 263a and 263b in response to movement of the observer in the direction of the arrow 272 so that the display tracks the observer movement.

Figures 29A, 29B:
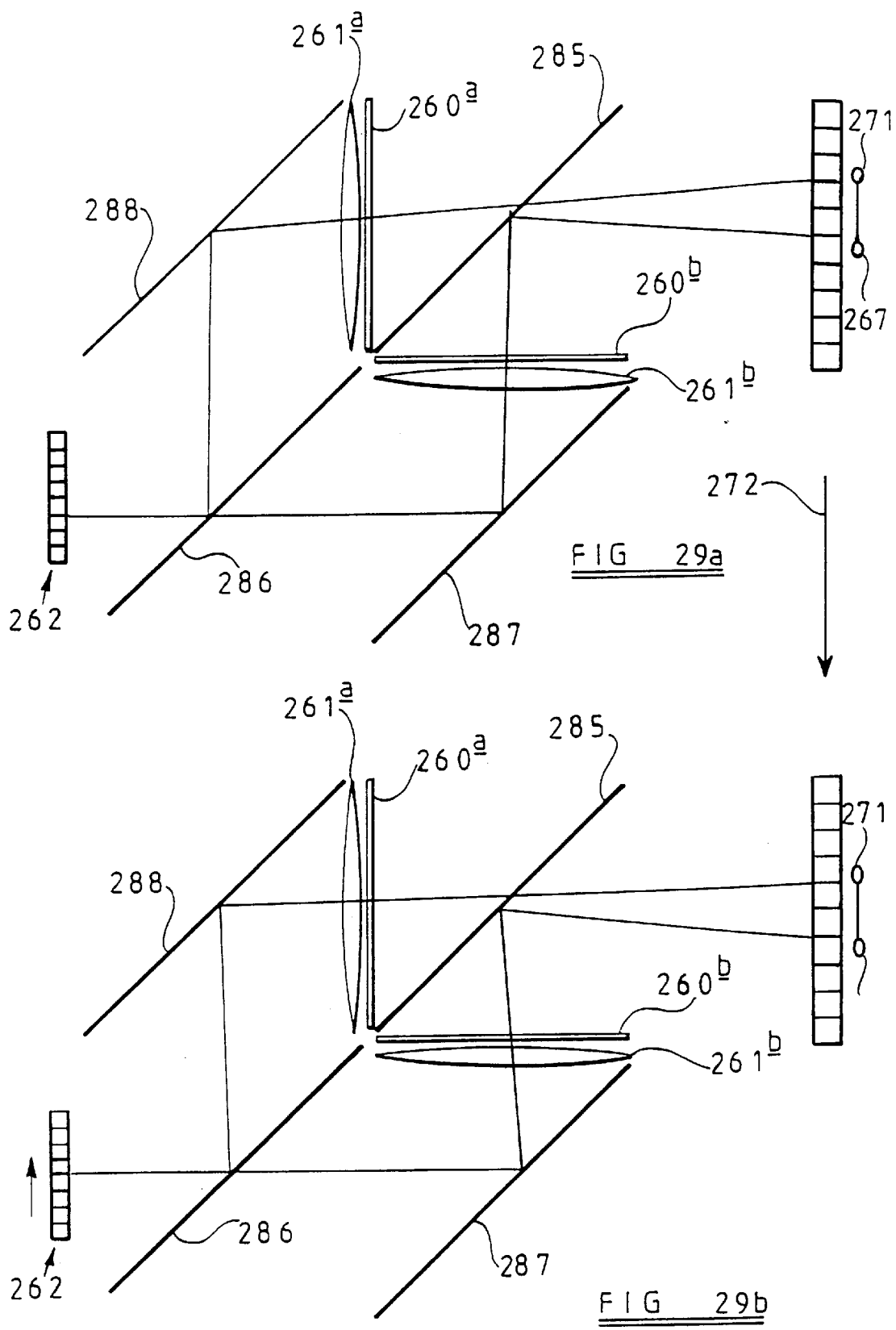
FIGS. 29a and 29b are schematic diagrams of a display apparatus constituting an eighteenth embodiment of the invention.

FIGS. 29a and 29b illustrate an autostereoscopic 3D display which is of the type shown in FIG. 3 and which differs from that shown in FIGS. 28a and 28b in that the two light sources are replaced by a single light source 262 of the type shown in FIGS. 24a and 24b together with a light dividing arrangement comprising a beam splitter 286 and reflectors 287 and 288. Light from the illumination source 262 is divided so as to simulate two light sources imaged at the positions of the left and right eyes 267 and 271, respectively. Again, FIG. 29b illustrates operation as a result of movement of the observer in the direction of the arrow 272.

In displays of the type shown in FIGS. 28a and 28b, light from the light source and the shutter 263a is transmitted by the beam combiner 285 whereas light from the light source and the shutter 263b is reflected by the beam combiner 285. This can give rise to disturbing colour differences because the reflection and transmission characteristics of the beam combiner 285 may vary in different ways with respect to colour. However, displays of the type shown in FIGS. 29a and 29b do not exhibit this phenomenon. In particular, by making the beam splitter 286 and the beam combiner 285 substantially identical, the light path through the beam splitter 286, via the mirror 287, and reflected by the beam combiner 285 undergoes one transmission and two reflections whereas light reflected by the beam splitter 286 is reflected by the mirror 288 and transmitted by the beam combiner 285 and therefore also undergoes two reflections and one transmission. Thus, light passing along the two optical paths undergoes the same colour mapping and colour differences are therefore reduced or eliminated.

The illumination sources of the embodiments shown in FIGS. 24a to 29b may comprise extended light sources associated with shutters, as described, or contiguous arrays of discrete light sources. In either case, these embodiments allow shutters or light source arrays of relatively low spatial resolution to be used in arrangements which provide observer tracking. For instance, light sources of the type shown in FIGS. 10 to 18 having a resolution limited by the size of the fluorescent tubes may nevertheless be used in observer tracking displays.

Figure 30:
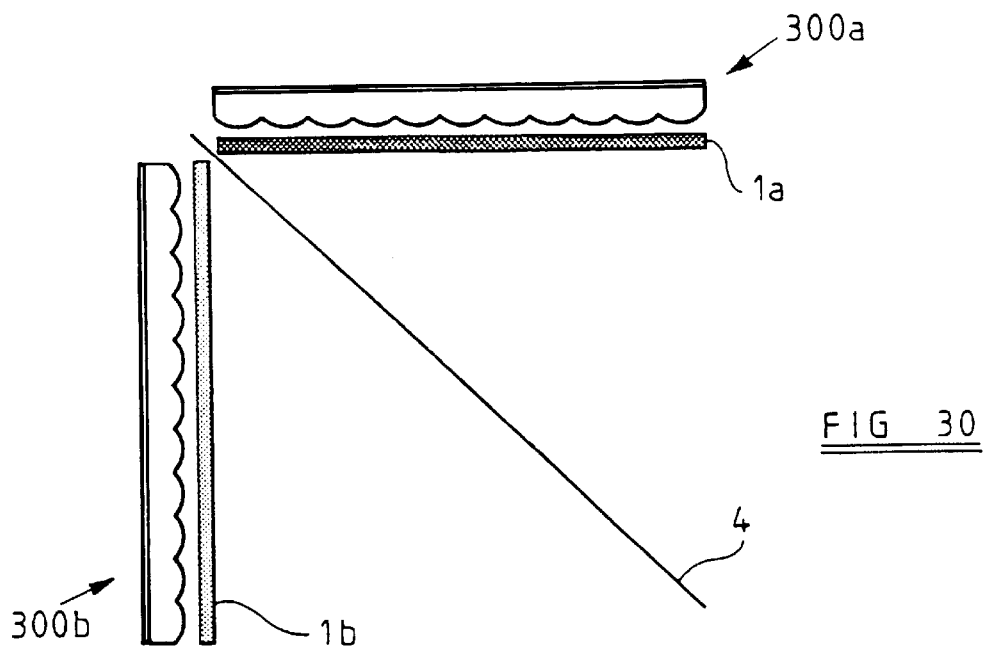
FIG. 30 is a schematic diagram of a display apparatus constituting a nineteenth embodiment of the invention.
Figure 31:
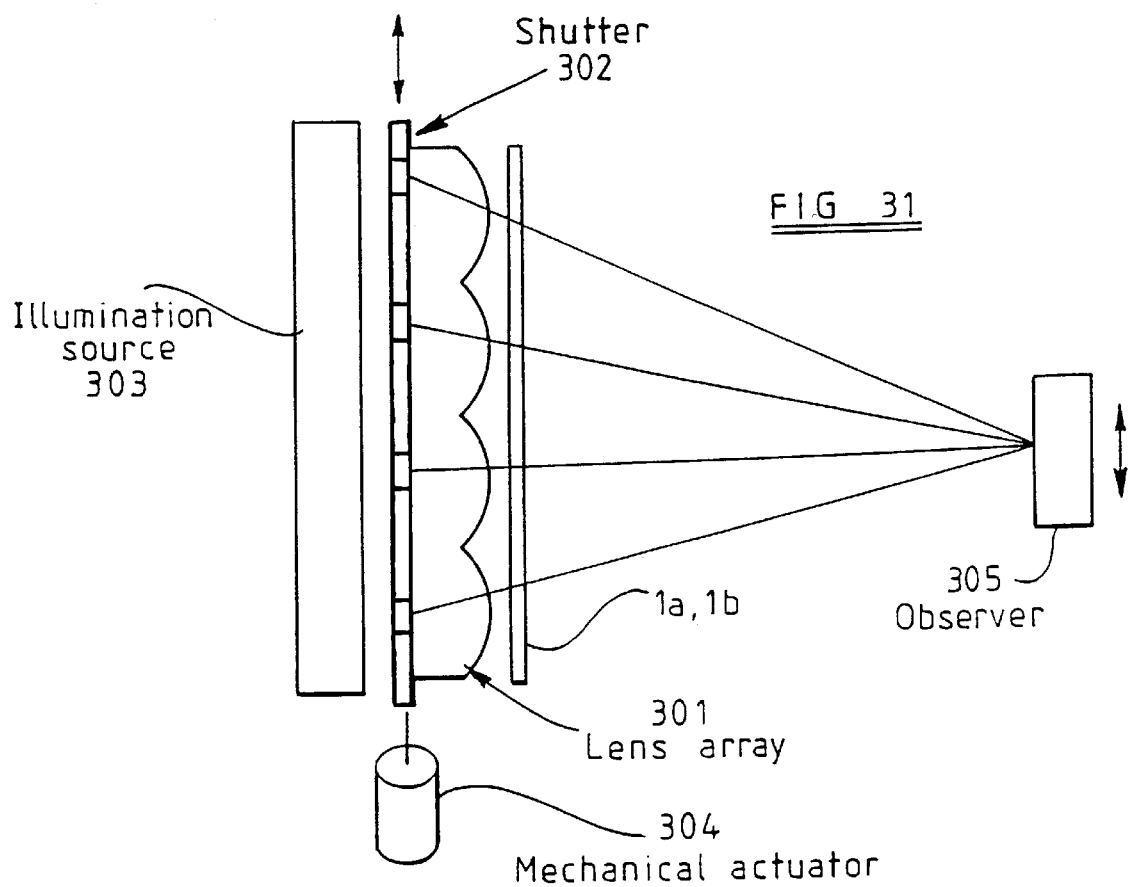
FIG. 31 shows part of the display of FIG. 30 in more detail.

FIG. 30 shows an autostereoscopic 3D display of a type similar to that shown in FIG. 1 and comprising SLMs 1a and 1b and a beam combiner 4. However, the illuminators 2a and 2b and the lenses 3a and 3b are replaced by compact light sources 300a and 300b, each of which comprises a lens array 301 such as a lenticular screen behind which is disposed an array of slits forming a shutter 302 and an extended source of illumination 303 (FIG. 31). The lenticular screen 301 may alternatively be replaced by a parallax barrier. Each lenticule of the lenticular screen is aligned with a respective slit so as to control the direction of illumination of the spatial light modulator 1a or 1b so that the left and right images are viewable by the left and right eyes, respectively, of an observer 305 located at a viewing region of the display.

The shutter 302 is connected to a mechanical actuator 304. A tracking system for tracking the position of the observer 305 supplies control signals to the actuator 304 so as to position the shutter 302 with respect to the lens array 301 so that the observer 305 can see the 3D image. The illumination source 303 and the shutter 302 thus form a movable source of illumination and the lens array 301 forms an imaging system for imaging the source of illumination at the observer 305.

FIG. 32 illustrates an alternative arrangement for tracking an observer in which the mechanically movable shutter 302 and the actuator 304 are replaced by a programmable shutter 306. The programmable shutter 306 may, for instance, comprise a LCD SLM which is controlled so as to provide transparent slits whose positions are movable in response to movement of the observer 305 s o that the 3D image tracks the observer.

Compact light sources of the type shown in FIGS. 30 to 32 may be used in place of the lenses or mirrors and illumination sources in the other embodiments shown in the drawings so as to provide relatively compact displays which are capable of tracking or more than one observer.

What is claimed is:

1. An autostereoscopic display for displaying a three dimensional image, comprising an observer tracking system for tracking the position of an observer, first and second displays for displaying left and right two dimensional images, respectively, and a beam combiner for combining light from the first and second displays, wherein the first and second displays comprise first and second light sources and first and second spatial light modulators for modulating light from the first and second light sources with the left and right two dimensional images, respectively, the first and second light sources comprising first and second extended sources of illumination, first and second shutters and first and second imaging systems for imaging light from the first and second sources of illumination via the first and second shutters, respectively, at a first viewing region, the first and second shutters being movable with respect to the first and second imaging systems, respectively, so that the first viewing region tracks the position of the observer.

2. A display as claimed in claim 1, wherein each of the first and second imaging systems comprises a lens array.

3. A display as claimed in claim 2, wherein each of the lens arrays comprises a lenticular screen.

4. A display as claimed in claim 1, wherein each of the first and second imaging systems comprises a parallax barrier.

5. A display as claimed in claim 1, wherein each of the first and second shutters comprises an array of slits.

6. A display as claimed in claim 1, wherein the display comprises a mechanical actuator responsive to the observer tracking system for moving the first and second shutters with respect to the first and second imaging systems, respectively.

7. An autostereoscopic display for displaying a three dimensional image, comprising an observer tracking system for tracking the position of a first observer, first and second displays for displaying left and right two dimensional images, respectively, and a beam combiner for combining light from the first and second displays, wherein the first and second displays comprise a single source of illumination, first and second imaging systems for imaging the source of illumination at a first viewing region, first and second spatial light modulators for modulating light from the source of illumination with left and right two dimensional images, respectively, and a beam splitter for directing light from the source of illumination to the first and second spatial light modulators, and further comprising a control system for controlling the position of light emission of the source of illumination so that the first viewing region tracks the position of the first observer.

8. A display as claimed in claim 7, wherein the beam splitter transmits light to a first reflector and reflects light to a second reflector and in that the beam combiner reflects light from the first reflector and transmits light from the second reflector.

9. A display as claimed in claim 7, wherein the source of illumination is movable.

10. A display as claimed in claim 9, wherein the source of illumination is movable optically towards and away from the first and second imaging systems for tracking movement of the first observer away from and towards the display.

11. A display as claimed in claim 7, wherein the source of illumination comprises an array of contiguous individually controllable light sources.

12. A display as claimed in claim 11, wherein the array is a one dimensional array.

13. A display as claimed in claim 11, wherein each of the controllable light sources comprises a light guide coupled to a light emitter.

14. A display as claimed in claim 13, wherein each of the light emitters comprises a cold cathode fluorescent emitter.

15. A display as claimed in claim 14, further comprising a heater for maintaining the fluorescent emitters substantially at the working temperature thereof.

16. A display as claimed in claim 7, wherein the first and second imaging systems are arranged to image the source of illumination at a second viewing region, the observer tracking system is arranged to track the position of a second observer, and the control system is arranged to control the position of further light emission of the source of illumination so that the second viewing region tracks the position of the second observer.

17. A display as claimed in claim 7, wherein the first and second imaging systems comprise first and second converging lenses.

18. A display as claimed in claim 7, wherein the first and second imaging systems comprise first and second converging mirrors.

19. A display as claimed in claim 18, wherein each of the first and second converging mirrors has a diffractive focusing pattern formed on a reflective surface thereof.

* * * * *